US010803189B2

(12) United States Patent
Kay et al.

(10) Patent No.: US 10,803,189 B2
(45) Date of Patent: Oct. 13, 2020

(54) LOCATION-BASED ACCESS CONTROL OF SECURED RESOURCES

(71) Applicant: Microsoft Technology Licensing, LLC, Redmond, WA (US)

(72) Inventors: Jonathan Matthew Kay, Redmond, WA (US); Stephen P. DiAcetis, Duvall, WA (US); David Mahlon Hoover, Woodinville, WA (US); Cristina del Amo Casado, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 90 days.

(21) Appl. No.: 15/253,847

(22) Filed: Aug. 31, 2016

(65) Prior Publication Data

US 2018/0060601 A1 Mar. 1, 2018

(51) Int. Cl.
*G06F 21/62* (2013.01)
*H04W 4/33* (2018.01)
(Continued)

(52) U.S. Cl.
CPC .......... *G06F 21/6218* (2013.01); *G06F 21/32* (2013.01); *H04L 63/107* (2013.01); *H04W 4/33* (2018.02); *H04W 12/08* (2013.01); *G06F 2221/2111* (2013.01); *H04W 4/02* (2013.01); *H04W 4/021* (2013.01); *H04W 4/029* (2018.02);
(Continued)

(58) Field of Classification Search
CPC ................. G06F 21/6218; G06F 21/32; G06F 2221/2111; H04L 63/0861; H04L 63/107
See application file for complete search history.

(56) References Cited

U.S. PATENT DOCUMENTS 7,027,995 B2 * 4/2006 Kaufman ........... G06Q 10/0631
705/7.12
7,551,727 B2 * 6/2009 Howell ................. H04M 3/385
379/88.14
(Continued)

FOREIGN PATENT DOCUMENTS

EP 2919431 A1 9/2015

OTHER PUBLICATIONS

Isler et al ("Isler," Physical Access Control with BACnet, Whitepaper, pp. 1-124, Sep. 27, 2008) (Year: 2008).*
(Continued)

*Primary Examiner* — Luu T Pham
*Assistant Examiner* — James J Wilcox
(74) *Attorney, Agent, or Firm* — Newport IP, LLC; Scott Y. Shigeta

(57) ABSTRACT

Techniques described herein provide location-based access control to secured resources. Generally described, configurations disclosed herein enable a system to dynamically modify access to secured resources based on one or more location-related actions. For example, techniques disclosed herein can enable a computing system to control access to resources such as computing devices, display devices, secured locations, and secured data. In some configurations, the techniques disclosed herein can enable controlled access to secured resources based, at least in part, on an invitation associated with a location and positioning data indicating a location of a user.

16 Claims, 11 Drawing Sheets

(51) Int. Cl.

| | |
|---|---|
| *H04L 12/08* | (2006.01) |
| *G06F 21/32* | (2013.01) |
| *H04L 29/06* | (2006.01) |
| *H04W 4/021* | (2018.01) |
| *H04W 4/029* | (2018.01) |
| *H04W 48/04* | (2009.01) |
| *H04W 4/80* | (2018.01) |
| *H04W 4/21* | (2018.01) |
| *H04W 12/00* | (2009.01) |
| *H04W 4/14* | (2009.01) |
| *H04W 4/02* | (2018.01) |
| *H04W 12/08* | (2009.01) |

(52) U.S. Cl.
CPC ............ *H04W 4/14* (2013.01); *H04W 4/21* (2018.02); *H04W 4/80* (2018.02); *H04W 12/00503* (2019.01); *H04W 48/04* (2013.01)

(56) References Cited

U.S. PATENT DOCUMENTS

| | | | | |
|---|---|---|---|---|
| 8,276,081 | B2* | 9/2012 | Boyd | G06Q 10/109 715/751 |
| 8,868,036 | B1* | 10/2014 | Nasserbakht | G06Q 10/109 455/410 |
| 9,021,569 | B1* | 4/2015 | Kashyap | G06F 21/35 726/7 |
| 9,319,843 | B2* | 4/2016 | Lerenc | H04W 4/027 |
| 9,432,372 | B2* | 8/2016 | Anantharaman | H04L 12/1822 |
| 9,824,333 | B2* | 11/2017 | Shaw | G06Q 10/109 |
| 9,973,550 | B2* | 5/2018 | Haskins | G06F 16/245 |
| 10,389,769 | B2* | 8/2019 | Gudipaty | G06Q 10/10 |
| 10,510,026 | B1* | 12/2019 | Adamson | G06F 9/543 |
| 10,616,278 | B1* | 4/2020 | Johansson | H04L 63/0838 |
| 2004/0093290 | A1* | 5/2004 | Doss | G06Q 10/1095 705/35 |
| 2005/0101335 | A1* | 5/2005 | Kelly | G06Q 10/109 455/456.3 |
| 2006/0058045 | A1* | 3/2006 | Nilsen | H04L 67/24 455/456.5 |
| 2006/0224969 | A1* | 10/2006 | Marston | G06Q 10/109 715/753 |
| 2007/0005406 | A1* | 1/2007 | Assadian | G06Q 10/109 705/7.18 |
| 2007/0182546 | A1* | 8/2007 | Virk | H04W 4/02 340/539.13 |
| 2007/0226035 | A1* | 9/2007 | Doss | G06Q 40/00 705/7.19 |
| 2007/0273474 | A1* | 11/2007 | Levine | G05B 15/02 340/5.28 |
| 2008/0281979 | A1* | 11/2008 | Keeler | H04L 47/70 709/233 |
| 2008/0303811 | A1* | 12/2008 | Van Luchene | A63F 13/85 345/419 |
| 2009/0193087 | A1* | 7/2009 | Lee | G06Q 10/109 709/206 |
| 2009/0217176 | A1* | 8/2009 | Coulomb | G06Q 10/109 715/751 |
| 2011/0239276 | A1 | 9/2011 | Garcia Garcia et al. | |
| 2011/0307287 | A1* | 12/2011 | Conley | G06Q 10/109 705/7.19 |
| 2012/0150580 | A1* | 6/2012 | Norton | G06Q 10/1095 705/7.19 |
| 2012/0166437 | A1* | 6/2012 | Esteve Balducci | G01C 21/32 707/736 |
| 2012/0185291 | A1* | 7/2012 | Ramaswamy | G06Q 10/1095 705/7.19 |
| 2012/0216129 | A1* | 8/2012 | Ng | G06Q 10/00 715/753 |
| 2013/0060592 | A1* | 3/2013 | Motoyama | G06Q 10/1095 705/7.19 |
| 2013/0073670 | A1* | 3/2013 | Das | G06F 9/5027 709/217 |
| 2014/0059148 | A1* | 2/2014 | Boyd | H04L 63/0407 709/206 |
| 2014/0171129 | A1* | 6/2014 | Benzatti | H04L 67/18 455/457 |
| 2014/0195552 | A1* | 7/2014 | Lu | G06F 17/30292 707/756 |
| 2014/0236659 | A1* | 8/2014 | Hapse | G06Q 10/101 705/7.19 |
| 2014/0236876 | A1* | 8/2014 | Hapse | G06N 3/08 706/18 |
| 2014/0278673 | A1* | 9/2014 | Wetzold | G06Q 10/1095 705/7.19 |
| 2015/0074558 | A1* | 3/2015 | Haskins | G06F 3/04817 715/753 |
| 2015/0200925 | A1* | 7/2015 | Lagerstedt | H04L 63/062 726/6 |
| 2015/0264573 | A1* | 9/2015 | Giordano | H04L 63/08 726/7 |
| 2016/0026939 | A1* | 1/2016 | Schiffer | G06T 11/206 705/7.11 |
| 2016/0140546 | A1* | 5/2016 | Taratine | H04W 4/029 705/76 |
| 2016/0171805 | A1* | 6/2016 | Jang | G07C 9/10 382/118 |
| 2016/0173422 | A1* | 6/2016 | Kidron | G06Q 10/1095 705/7.19 |
| 2016/0182529 | A1 | 6/2016 | Biehl et al. | |
| 2016/0267439 | A1* | 9/2016 | Bitran | G06Q 10/1095 |
| 2016/0358126 | A1* | 12/2016 | Bostick | G06Q 10/1095 |
| 2017/0026830 | A1* | 1/2017 | Singh | H04L 63/107 |
| 2017/0126755 | A1* | 5/2017 | Singh | H04L 63/0442 |
| 2017/0236097 | A1* | 8/2017 | Smith | G06Q 10/1095 705/7.19 |
| 2017/0278070 | A1* | 9/2017 | Desai | G06Q 10/1095 |
| 2018/0077542 | A1* | 3/2018 | Xie | G06Q 10/10 |

OTHER PUBLICATIONS

Zhang Xin-Fang, "An Indoor Location-based Access Control System by RFID," IEEE International Conference on Cyber Technology in Automation, Control, and Intelligent Systems, Mar. 20-23, 2011, Kumming, China, pp. 43-47 (Year: 2011).*

Hengartner-Implementing Access Control to People Location Information, SACMAT'04, Jun. 2-4, 2004, pp. 11-20 (Year: 2004).*

"International Search Report and Written Opinion Issued in PCT Application No. PCT/US2017/048093", dated Nov. 27, 2017, 12 Pages.

* cited by examiner

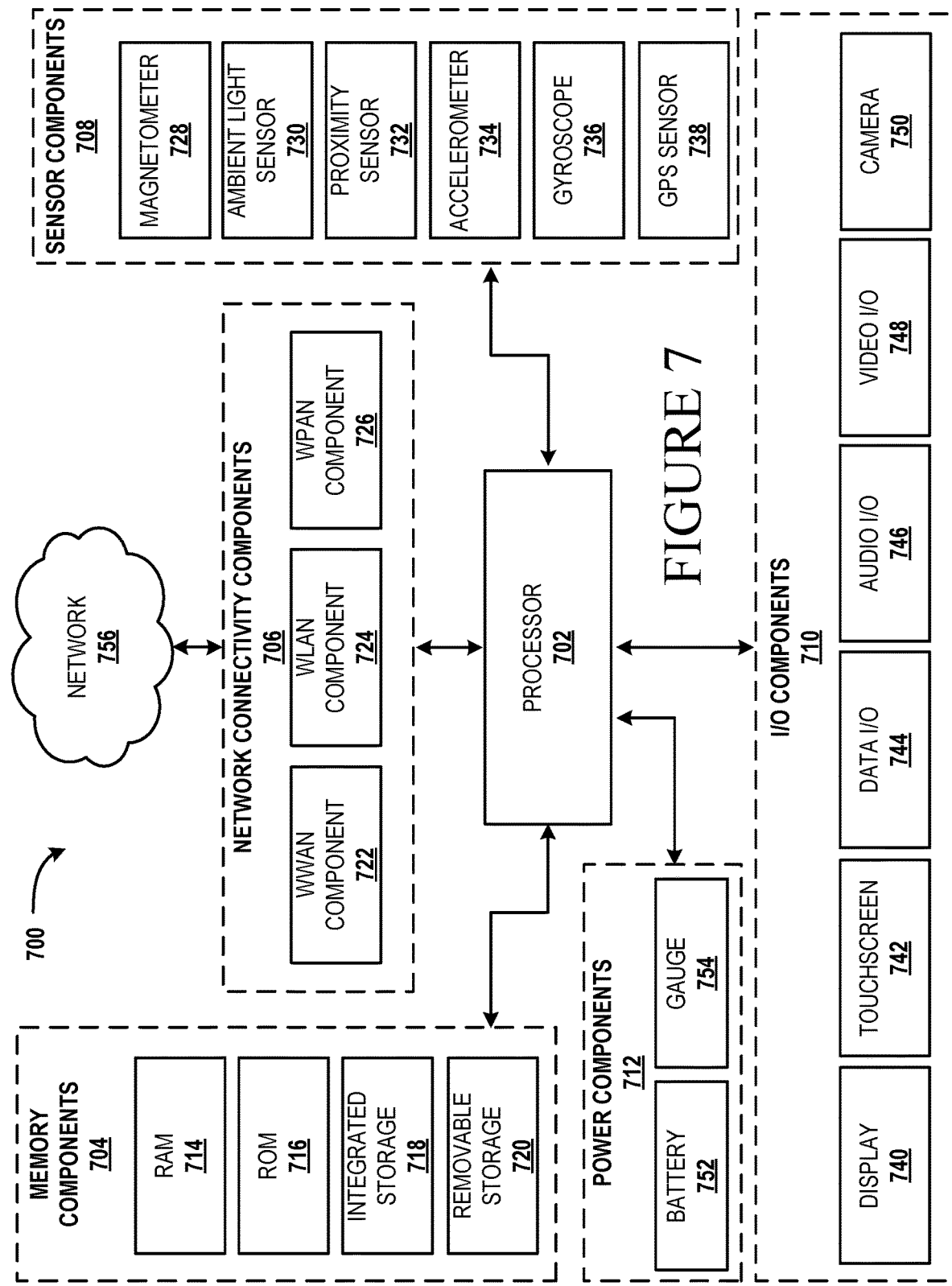

LOCATION-BASED ACCESS CONTROL OF SECURED RESOURCES

BACKGROUND

The tasks involved with managing a secure system can present challenges for companies of all sizes. For instance, the management of secured data having different levels of access permissions can be costly, and if not administered correctly, human error or other factors can cause security issues. In addition, some existing systems are limited to rigid configurations that can make it difficult to change access permissions. For example, when a user is in need of temporary access to secured data, such changes can require explicit input commands from an administrator. In addition, explicit input commands from an administrator are also needed when there is a need to revoke access permissions.

Additional concerns may arise when companies rely on third-party entities for hosting secured data. For instance, security concerns can arise when a company uses a third-party service to manage secured data, such as indoor map data, resource data, and positioning data for the resources. Although such services may provide more functionality than a self-managed turnkey system, there may be a number of drawbacks for companies that wish to maintain a high level of security against malicious users or even a business entity providing the third-party hosting service.

It is with respect to these and other considerations that the disclosure made herein is presented.

SUMMARY

Techniques described herein provide location-based access control of secured resources, which can include computing devices, secured locations, and data. Generally described, configurations disclosed herein enable a system to dynamically modify access to secured resources based on one or more location-related actions. For example, techniques disclosed herein can enable a computing system to control access to resources such as computing devices, display devices, secured locations, and secured data. In some configurations, the techniques disclosed herein can enable controlled access to secured resources based, at least in part, on an invitation associated with a location and positioning data indicating a location of a user.

For illustrative purposes, consider a scenario where a user associated with an identity does not have permissions to access a resource, such as a secured conference room. In addition, in this example, the user does not have permissions to utilize equipment associated with the conference room or access secured data associated with the conference room. When the user receives an invitation to attend a meeting at the conference room, a system can grant the user access to the conference room, equipment associated with the conference room, and access to the secured data associated with the conference room.

The system can track the movement of the user and/or determine a position of the user and modify the granted permissions based on the movement and/or the position. In some configurations, the system can receive positioning data indicating a pattern of movement and/or the position of the user's mobile computing device and modify, e.g., revoke, the access to one or more resources when the pattern of movement and/or the position meets one or more criteria. For example, access permissions to one or more resources associated with the conference room can be revoked, abridged, or otherwise modified when the user exits the conference room. Any number of geo-fencing technologies can be utilized by the techniques disclosed herein. For example, one or more user or device interactions with a geo-fencing system can influence a server or device to revoke, abridge, or modify access permissions to one or more resources.

In accordance with the above-example, stated in more general terms, the invitation can comprise scheduling data defining a calendar event associated with a location. The scheduling data can comprise data defining an identity, which can be associated with an account, smart card, certificate or any other form of authentication.

The system can also receive permission data managed by an authentication system. In some configurations, the authentication system can include one or more servers running a directory service, such as MICROSOFT'S ACTIVE DIRECTORY or any other service operating an authentication protocol, such as OpenID. In such configurations, permission data can be generated when credentials associated with the identity, e.g., the user's identity, are verified by the authentication system. Permission data indicating one or more permissions associated with the identity can be communicated to the system in response to the verification of the identity.

In response to receiving the permission data from the authentication system and receiving the scheduling data defining the location and the identity, the system can provide access to at least one resource associated with the location. In some configurations, access to the resource is provided to at least one client computing device associated with the identity.

In some configurations, the system can dynamically modify the granted access based on one or more actions. For example, the system can modify the granted access in response to receiving positioning data meeting one or more criteria. In such an example, the system can revoke access based on specific patterns of movement, such as a person exiting a designated location, such as a conference room or a building. In another example, the system can revoke access to secured resources based on the detection of predetermined patterns of movement, such as a person passing through an area, e.g., an egress, associated with the location in a predetermined direction.

Configurations disclosed herein can analyze positioning data received from a computing device associated with the user. As described in more detail below, positioning data received from one or more systems, such as one or more GPS devices, Bluetooth LE proximity beacons, wireless routers, or other suitable devices, can utilized by the techniques disclosed herein. In addition, configurations disclosed herein can analyze other types of data from other systems to identify a user and the user's position and/or pattern of movement. For instance, the system can utilize imaging technologies, such as facial recognition, to identify a person moving within a field of view of a camera or other type of detector or sensor. Data indicating the position of the camera, heat sensor, motion detector, sound detector or any other type of detector or sensor, can be utilized to identify the position and/or pattern of movement of a detected user. As will be described herein, such data can be utilized to control access permissions to one or more resources. In some configurations, positioning data and other data can be analyzed from multiple systems and multiple computing devices to identify a position or a pattern of movement of one or more users.

Through data abstraction, some configurations can involve federated database systems for providing a uniform user interface, enabling users and clients to store and retrieve data from multiple noncontiguous databases with a single query, even when the constituent databases are heterogeneous. In some configurations, a federated database system can decompose the query into subqueries for submission to the relevant constituent database management systems, after which the system can composite the result sets of the subqueries. Because various database management systems can employ different query languages, federated database systems can apply wrappers to the subqueries to translate them into the appropriate query languages.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

FIG. 7 is a computer architecture diagram illustrating a computing device architecture for a computing device capable of implementing aspects of the techniques and technologies presented herein.

DETAILED DESCRIPTION

The following Detailed Description describes technologies enabling location-based access control of secured resources. Generally described, configurations disclosed herein enable a system to dynamically grant and revoke access to secured resources based on one or more location-related actions. For example, techniques disclosed herein can enable controlled access to resources such as computing devices, display devices, secured locations, and secured data. In some configurations, the techniques disclosed herein can enable controlled access to secured resources based, at least in part, on an invitation associated with a location and positioning data indicating a location of a user.

For illustrative purposes, consider a scenario where a user associated with an identity does not have permissions to access a secured conference room. In addition, the user does not have permissions to utilize equipment associated with the conference room or permissions to access secured data associated with the conference room. When the user receives an invitation to attend a meeting at the conference room, a system can grant the user access to the conference room, equipment associated with the conference room, and access to secured data associated with the conference room.

The system can track the movement of the user and/or determine a position of the user, and modify the granted permissions based on the movement and/or the position. In some configurations, the system can receive positioning data indicating a pattern of movement and/or a position of the mobile computing device and modify, e.g., revoke, the access to one or more resources when the pattern of movement meets and/or the position one or more criteria. For example, access permissions to one or more resources associated with the conference room can be revoked when the user exits the conference room.

Figure 1:
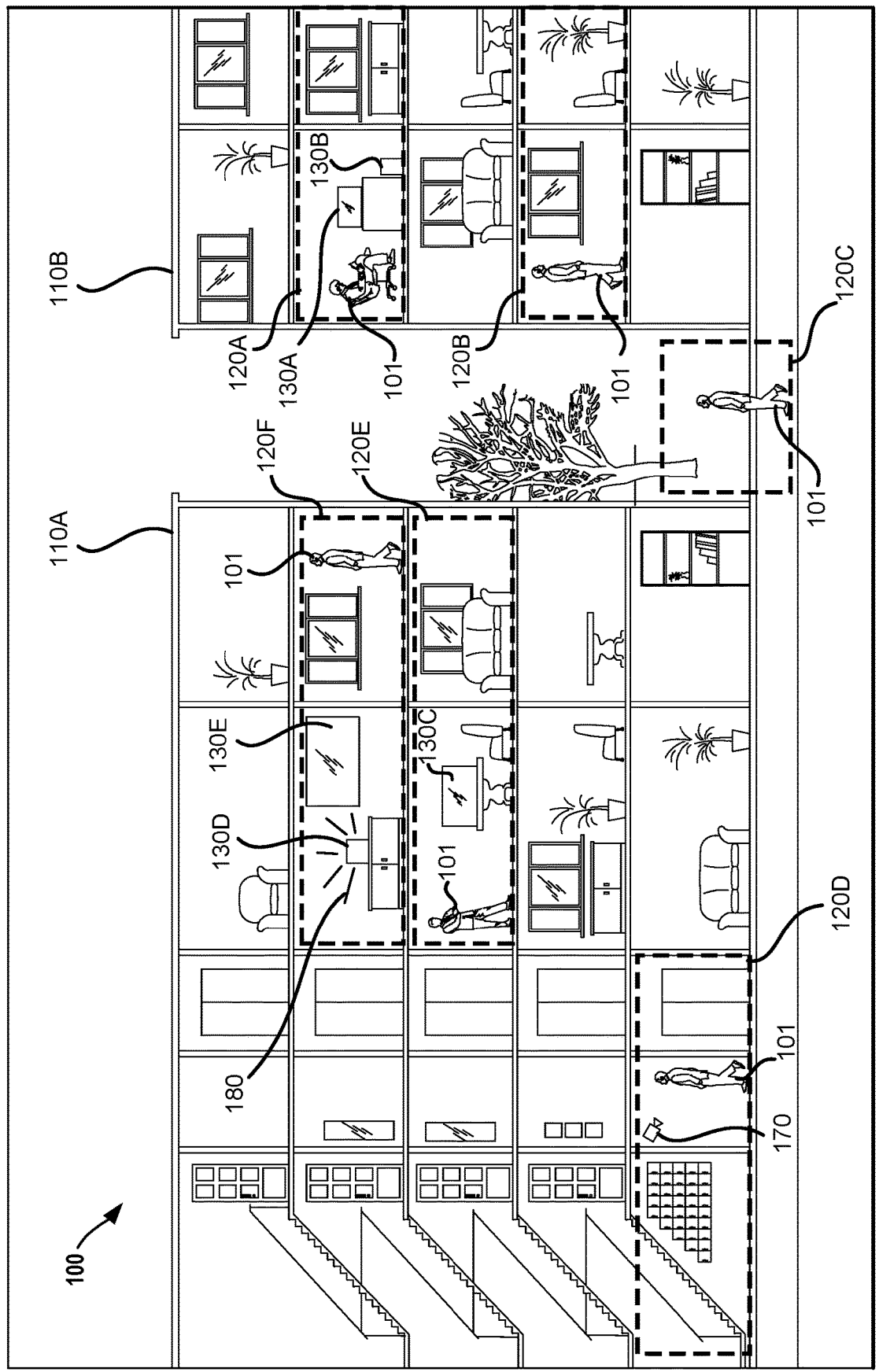
FIG. 1 is a diagram showing attributes of a scenario consequential of a system for providing location-based access control of secured data.

To illustrate aspects of the techniques disclosed herein, FIG. 1 shows an environment 100 having a number of buildings 110, a number of locations 120, and a number of resources 130. The example of FIG. 1 involves a first building 110A and a second building 110B, which represent part of a campus environment. Also shown, FIG. 1 illustrates a user 101 in various locations 120. In this example, a system dynamically grants access to various resources 130 based on one or more actions, conditions, and/or criteria, such as a receipt of an invitation, a location of the user 101, a location of a computing device associated with the user 101, and/or the user's interactions with one or more resources 130.

Although this example includes a campus environment, it can be appreciated that the techniques disclosed herein can be applied to any environment having controlled access to one or more resources. For instance, the techniques disclosed herein can be applied to a factory, oil refinery, or any other environment that may benefit from a system that can provide different levels of access for different resources to individual identities or select groups of identities.

For illustrative purposes, the resources 130 can include, but are not limited to, computing devices, printers, display screens, telephones, rooms of a building, and other types of computer-controlled facilities. The resources 130 can be associated with one or more locations. The present example involves a first display screen 130A and a first computer 130B are associated with the first location 120A. A second display screen 130C is associated with the fifth location 120E, and a second computer 130D and a third display screen 130E are associated with the sixth location 120F. As will be described in more detail below, an association between a resource 130 and a location 120 enables a system to control access to a resource 130 based on positioning data indicating a location of a user.

In this example, locations 120 within the buildings 110 are designated as resources 130, and a system can control access to such resources 130 by the use of electronic door locks, elevator doors, and other security devices. As shown, the locations 120 can be associated with rooms, groups of rooms, floors, hallways, egress areas, pathways, doors, etc.

Individual buildings 110 and areas around the buildings 110 can have a number of locations 120 where a computer system can generate positioning data indicating the location of users and/or computing devices within the locations 120. For example, WI-FI technologies or other wired or wireless technologies can enable a system to determine when a person enters, moves within, or exits a particular location 120.

Positioning data indicating a location of a user can be generated by a number of suitable technologies. For instance, positioning data indicating a location of a user can be generated by a mobile computing device. In another example, positioning data indicating a location of a user can be generated by a camera system utilizing profiling technologies, such as face recognition technologies, to identify and track the movement of a user.

In the example of FIG. 1, a first location 120A is located on the fourth floor of the second building 110B, and a second location 120B is located on the second floor of the second building 110B. A third location 120C is located between the first building 110A and the second building 110B. A fourth location 120D, a fifth location 120E, and a sixth location 120F are respectively on the first, third, and fourth floor of the first building 110A. This example is provided for illustrative purposes and is not to be construed as limiting. Aspects of the present disclosure can be applied to any suitable environment 100 having any number of buildings 110 ("structures 110"), any number of locations 120, and any number of resources 130. As will be described in more detail below, configurations described herein can control access to one or more locations based on a location of a user or a location of a user's computing device.

A system granting access to the resources 130 can selectively communicate resource data to a client computing device based on one or more permissions. Resource data, for instance, can include metadata and control data. Metadata, for instance, can comprise information describing, or information associated with, one or more facilities. For example, metadata can include, but is not limited to, data related to computing devices, printers, display screens, telephones, rooms of a building, security systems, network devices, and other types of resources 130. In some specific examples, metadata can include access codes and operational parameters one or more computing devices. In other examples, metadata can describe the contents of a room, an organizational chart associating individuals of the company with individual offices, or any other resource 130. Metadata can also describe a position of one or more resources 130. The control data, for instance, can comprise instructions, commands or other code for controlling computing devices or systems, such as security systems, elevator doors, secured doors, etc. Metadata can also include positioning data indicating a position of a user or resource. For example, metadata can indicate a position of a particular user, a group of users, a printer, a computer display screens, telephones, rooms of a building, security systems, network devices, and other types of resources 130. The metadata can also indicate a threshold level of accuracy with respect to the position of a user or resource.

In some configurations, the metadata can include map data defining aspects of buildings or other structures. For instance, map data can define aspects of an indoor space, e.g., locations of walls, doorways, pathways, or other points of interest of a structure. The map data can also define aspects of an outdoor space, e.g., roads and other types of travel paths within a geographic area. The map data can also include topography data and other data that may influence a commute of a user from one location to another. The map data can also include image data which may include still image or video image data of roads and paths within a geographic area as well as images of buildings and other landmarks. The map data can be based on global positioning coordinates, coordinates defined by private or public beacons, or any other suitable resource. The map data can include indoor map data and outdoor map data. The map data can be utilized by one or more client computing devices for navigational purposes.

Returning to FIG. 1, consider a scenario where the user 101 has access to a first category of resources 130 associated with the second building 110B: the first display screen 130A, the first computer 130B, and metadata associated with the second building 110B. The user 101 also has permissions to enter locations 120A and 120B of the second building 110B. However, in this example, the user 101 does not initially have access to resources 130 associated with the first building 110A.

In the present example, the user 101 is granted access to resources 130 associated with the first building 110A when the user 101 receives an invitation to a meeting located at the first building 110A. For illustrative purposes, the invitation can be in the form of an email, text, instant message, work order, or any other suitable form of communication that identifies an identity associated with the user and at least one resource or location. In the present example, the invitation includes a calendar request identifying the user and a location, a room associated with the sixth location 120F.

Upon receiving the invitation, it is a given in this example that the user is granted access to the resources 130 associated with the sixth location 120F. Specifically, the system grants access to the elevator door permitting access to the sixth location 120F and access to the second computer 130D and the third display screen 130E. In addition, in response to receiving the invitation, the system grants access to metadata associated with the sixth location 120F. The techniques provide a level of granularity with respect to the access to resources, such that the user 101 is not granted access to resources 130 associated with the fifth location 120E.

In some configurations, access to resources 130 can be based on receipt of the invitation and other actions, such as a pattern of movement of the user 101. For example, the user 101 may only receive access to the resources 130 associated with the sixth location 120F when the user 101 receives the invitation and when the user passes through the third location 120C between the first building 110A and the second building 110B.

In some configurations, the system is configured to modify, e.g., revoke, the access to the resources 130 associated with the sixth location 120F based on one or more actions, conditions, and/or criteria. For example, access to some resources 130 can be modified based on a cancellation of an invitation, a location of the user 101, a location of a computing device associated with the user 101, a user's interactions with one or more resources 130, and/or positioning data indicating predetermined movement patterns of the user.

In the present example, the system revokes access the to the resources 130 associated with the sixth location 120F in response to receiving positioning data indicating a pattern of movement of the user 101 or a computing device associated with the user 101. For instance, access to the resources 130 associated with the sixth location 120F can be revoked when the user 101 enters and leaves the first building 110A. The pattern of movement of the user can be detected by a computing device, such as a mobile phone carried by the user, or another device, such as a camera 170 in communication with the system. In such configurations, positioning data indicating predetermined movement patterns of the user can be based, at least in part, on image data captured by the camera 170.

In one variation of the present example, the system can revoke access to the resources 130 associated with the sixth location 120F based on an interaction the user has with one or more resources 130. For instance, if the user 101 utilizes the second computer 130D or the third display screen 130E, the system may revoke or otherwise modify the access to the resources 130 when a user has concluded his or her interaction with such resources. In other examples, access rights can be revoked or modified when the user 101 accesses certain doors, walks down a particular hallway in a particular direction, or otherwise interacts with one or more facilities. In yet another example, access rights can be modified for one or more resources when the user 101 is positioned within a particular area. For example, the system can revoke access to the resource 130 when the user is in a particular hallway, office, or any predetermined area. The analysis of the positioning data can also involve a time component. For instance, access rights can be modified for one or more resources when a user's movement and/or position at a predetermined location occurs within a particular timeframe. These examples are provided for illustrative purposes and are not to be construed as limiting. It can be appreciated that positioning data can be analyzed to determine if a user's movement and/or position meets any suitable set of criteria.

In some configurations, the positioning data collected by the system can be stored in a memory device. The stored positioning data can indicate a time of various events, such as a user's ingress, egress, time of stay, and other activity. The stored position data can be used for auditing and/or machine learning purposes.

In some configurations, a map or a building floor plan can be displayed on an interface of a user device. The display can be modified based on a number of actions. For instance, if access to a particular resource is granted or modified, aspects of a map or a building floor plan can be graphically highlighted or otherwise augmented to bring focus to the resource. Any resource, such as printers, data servers, hallways, or rooms, can be represented by one or more graphical elements. The system can bring highlight to such graphical elements when access permissions are granted or modified. In one illustrative example, a graphical representation of the map shown in FIG. 1 can be displayed on an interface of a user device. When access permissions for a particular resource, such as the second computer 130D, are granted to a user, a graphical element of the second computer 130D can be displayed. When the user approaches the second computer 130D, one or more highlights 180 can be displayed to bring focus to the resource and identify the location of the resource. Focus to one or more resources can be enabled by any graphical augmentation, such as a change in color, brightness, or the generation of any other graphical element that draws focus to a resource.

Figure 2:
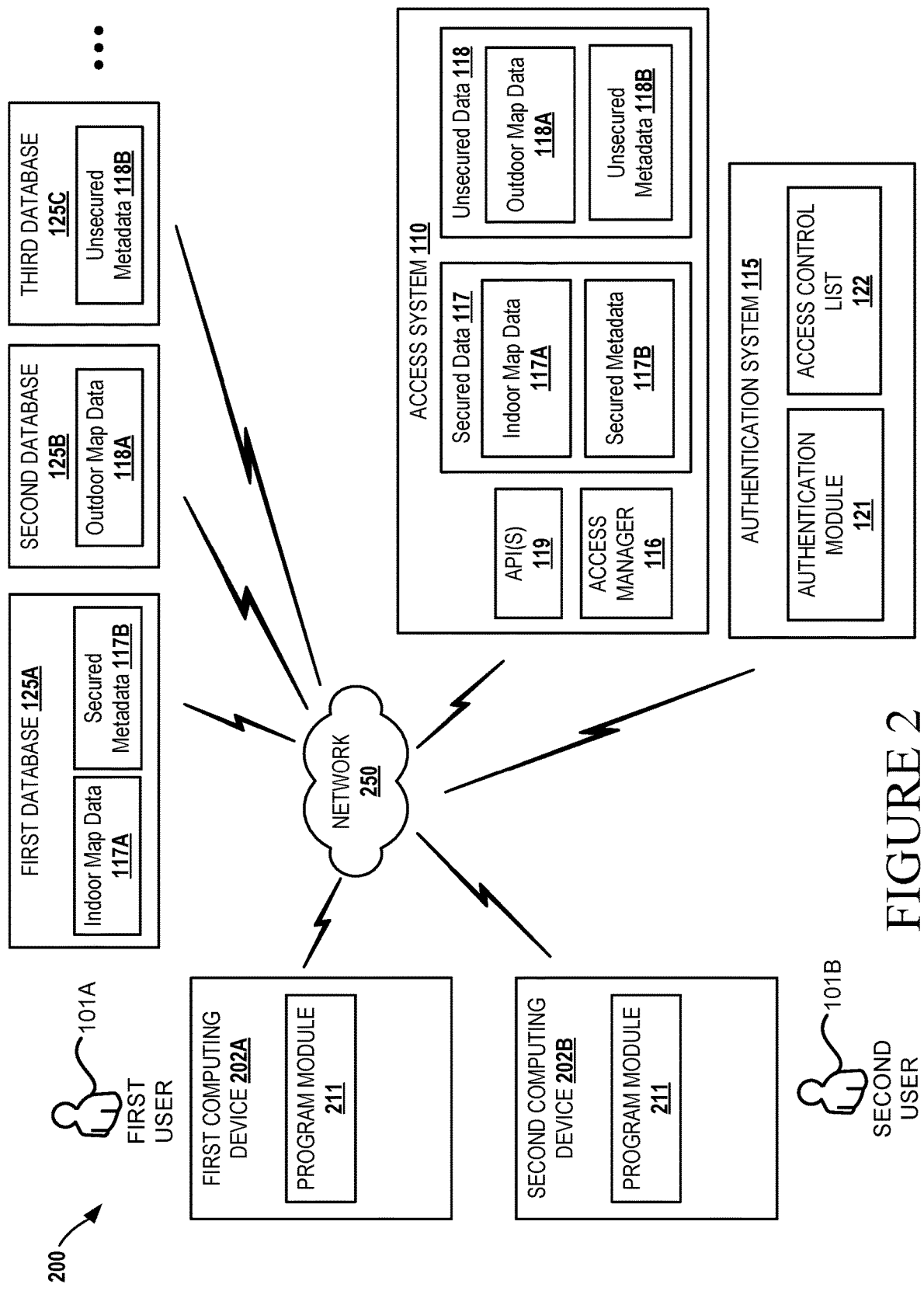
FIG. 2 is a diagram showing an illustrative system for enabling location-based access control of secured data.

Referring now to FIG. 2, aspects of a system 200 for providing location-based access control of secured resources is provided. It should be appreciated that the subject matter described herein can be implemented as a computer-controlled apparatus, a computer process, a computing system, or as an article of manufacture such as a computer-readable storage medium. These and various other features will be apparent from a reading of the following Detailed Description and a review of the associated drawings. Furthermore, the claimed subject matter is not limited to implementations that solve any or all disadvantages noted in any part of this disclosure.

As will be described in more detail herein, it can be appreciated that implementations of the techniques and technologies described herein may include the use of solid state circuits, digital logic circuits, computer component, and/or software executing on one or more devices. Signals described herein may include analog and/or digital signals for communicating a changed state, movement and/or any data associated with motion detection. Gestures, e.g., which can be in the form of any type of movement, captured by users of the computing devices can use any type of sensor or input device.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

By the use of the technologies described herein, a system can provide location-based access control of secured resources. Such technologies can improve user interaction with a computing device by providing a single interface to obtain resource data having various levels of access permissions from a number of different systems. Configurations disclosed herein can be beneficial in assisting users and business entities by controlling access to secured resources based on positioning data indicating a location of a user. Among many benefits provided by the technologies described herein, a user's interaction with a device may be improved, which may reduce the number of inadvertent inputs, reduce the consumption of processing resources, and mitigate the use of network resources. Other technical effects other than those mentioned herein can also be realized from implementations of the technologies disclosed herein.

In the following description, references are made to the accompanying drawings that form a part hereof, and in which are shown by way of illustration specific configurations or examples. Referring to the system drawings, in which like numerals represent like elements throughout the several figures, aspects of a computing system, computer-readable storage medium, and computer-implemented methodologies for providing location-based access control of secured resources. As will be described in more detail below with respect to FIGS. 5-7, there are a number of applications and services that can embody the functionality and techniques described herein.

FIG. 2 is a block diagram showing aspects of one example system 200 disclosed herein for providing a location-based access control of secured resources. In one illustrative example, the example system 200 can include an access system 110, an authentication system 115, one or more client computing devices 202A-202B ("devices 202"), one or more database systems 125A-125B (generically referred to as "database systems 125"), and one or more networks 250. As will be described below, the devices 202 can be utilized for interaction with one or more users 101A-101B ("users 101") for accessing resource data from the database systems 125 via a uniform interface of the access system 110 based on permission data generated by the authentication system 115. This example is provided for illustrative purposes and is not to be construed as limiting. It can be appreciated that the system 200 can include any number of devices, database systems, users, access systems, and/or any number of authentication systems.

The system 200 enables the client computing devices 202 to interact with a uniform interface for accessing different types of resource data that is stored in different database systems 125. By providing a uniform interface, enabling users and clients to store and retrieve data from multiple noncontiguous databases with a single query, even if the database systems 125 are heterogeneous. In some configurations, a federated database system can decompose a query generated by a client computing device 202 into subqueries for submission to the relevant constituent database management systems, after which the system can composite the result sets of the subqueries. Because various database management systems can employ different query languages, the database systems 125 or the access system 110 can apply wrappers to the subqueries to translate them into the appropriate query languages.

For illustrative purposes, in the example shown in FIG. 2, the first database system 125A is a secured system storing indoor map data and metadata, the second database system 125B is a publically accessible system, such as GOOGLE MAPS, storing outdoor map data, and the third database system 125C is another publically accessible system, such as a generic search engine, social network, or ecommerce site, storing metadata. As summarized above, metadata can include positioning data, which can indicate a position of a resource or user. When a client computing device 202 sends a request for resource data stored at the database systems 125, the access system 110 can receive permission data from the authentication system 115 to determine if the client computing device 202 is to receive the requested data.

In some configurations, the access system 110, authentication system 115, and individual databases can be independently managed and/or administered by different business entities or different departments of an entity. For instance, administrative control of the access system 110 may be separated from the administrative control of the authentication system 115 by a management separation, staffing separation, or another arraignment where individuals or entities managing or controlling each data store do not overlap. In addition, administrative control of the individual database systems can each be separated from one another. Separation of the administrative control of each data store and the other components of the system 200 helps mitigate security concerns.

For illustrative purposes, the client computing device 202 may be associated with an organization, individual, company, machine, system, service, device, or any other entity that utilizes at least one identity having credentials stored at the authentication system 115. An identity, for example, may be associated with a user account, smart card, certificate or any other form of authentication. The individual, device, business or entity associated with the client computing device 202 may subscribe to, or at least utilize, services offered by the authentication system 115 without having the need for the authentication system 115 to store private metadata, such as indoor maps and other metadata. The access system 110 can store the private metadata and/or retrieve the private metadata from the various database systems 125. These examples are provided for illustrative purposes and are not to be construed as limiting. It can be appreciated that the systems and devices can be combined in different ways to create a desired separation of private data depending on the type of data that is stored.

The access system 110, authentication system 115, devices 202, and the database systems 125, and/or any other computer configured with the features disclosed herein can be interconnected through one or more local and/or wide area networks, such as the network 250. In addition, the computing devices can communicate using any technology, such as BLUETOOTH, WIFI, WIFI DIRECT, NFC or any other suitable technology, which may include light-based, wired, or wireless technologies. It should be appreciated that many more types of connections may be utilized than described herein.

Individual devices 202 can operate as a stand-alone device, or such devices can operate in conjunction with other computers, such as the one or more servers 120. Individual computing devices can be in the form of a personal computer, mobile phone, tablet, wearable computer, including a head-mounted display (HMD) or a watch, or any other computing device having components for interacting with one or more users 101. In one illustrative example, individual devices 202 and the provider device 104 can include a local memory (FIG. 5), also referred to herein as a "computer-readable storage medium," configured to store data and code modules, such as a program module 211 and resource data.

The access system 110, authentication system 115, and the database systems 125 can be in the form of a personal computer, a server farm, a large-scale system or any other computing system having components for processing, coordinating, collecting, storing, and/or communicating data between one or more computing devices. In one illustrative example, the servers 120 can include a local memory (FIG. 5), also referred to herein as a "computer-readable storage medium," configured to store data and code modules, such as the access manager 116 and the authentication module 121. The access system 110, authentication system 115, and the database systems 125 can also include components and services, such as the application services and shown in FIG. 6, for providing, receiving, and processing resource data and executing one or more aspects of the techniques described herein.

The authentication system 115 can operate one or more authentication services, such as MICROSOFT'S ACTIVE DIRECTORY or any other service operating an authentication protocol, such as OpenID, can be utilized to manage credentials and generate permission data for use by the access system. Credentials can be received at the authentication system 115 from one or more devices 202, and the authentication system 115 can generate permission data for enabling the access system 110 to control access to one or more resources 130. In addition, the access system 110, authentication system 115, and the database systems 125 can provide, or have access to, one or more services such as a service offering data management software, calendaring software, or other services.

In some configurations, the access system 110 comprises an application programming interface 119 ("API 119") exposes an interface through which an operating system and application programs executing on the computing device can enable the functionality disclosed herein. Through the use of this data interface and other interfaces, the operating system and application programs can communicate and process resource data and other data.

Controlled access of specific portions of resource data can be enabled by associating permission levels with one or more categories of resource data. In one illustrative example, the system 200 shown in FIG. 2 comprises a first category of resource data having a first level of access, e.g., secured data 117, and a second category of resource data having a second level of access, e.g., secured data 118.

To illustrate aspects of this example, secured data 117 includes indoor map data 117A and secured metadata 117B. The unsecured data 118 includes outdoor map data 118A and unsecured metadata 118B. As summarized above, the metadata can include positioning data, which can indicate a position of a resource or user. In this example, the indoor map data 117A and secured metadata 117B are provided by the first database system 125A, e.g., a privately managed system, the outdoor map data 118A is provided by the second database system 125B, e.g., a publically available system, and the unsecured metadata 118B is provided by the third database system 125C, e.g., a search engine, social network, etc. This example is provided for illustrative purposes and is not to be construed as limiting. It can be appreciated that any number of levels can be associated with any portion of resource data to enable granular levels of access for an identity, e.g., a user associated with an account, or a group of identities. It can also be appreciated that different types of resource data can come from more or fewer computing devices.

The access system 110 receives permission data from the authentication system 115 for enabling controlled access to one or more portions of resource data. To generate permission data, the authentication system 115 can associate identities with entries defining roles and/or privileges. The roles and/or privileges allow or deny the execution of operations to access and/or manage resource data for the one or more associated identities. Among many other implementations, techniques described herein utilize the access control list 122 and a data manager 116 to manage granular levels of access control to different types of resource data. For instance, the system 200 can allow one identity, or a first group of identities, to receive and utilize a first portion of the secured metadata 117B, e.g., access codes to a building or access to data an employee directory, while denying another identity, or a second group of identities, access to the same data. Such configurations enable the access system 110 to receive permission data from the authentication system 115 to enable the access system 110 to grant access to various resources 130 with a predetermined level of granularity.

In one illustrative example, the techniques disclosed herein can provide different levels of access to different individuals or groups of individuals. For instance, a first level of access can be granted for full-time employees of a company, and a second level of access can be granted for vendors or contractors. In the examples described below, access to secured data and other resources are granted to an individual identity. It can be appreciated that the techniques disclosed herein can also grant access to secured data and other resources to groups of identities.

Referring now to FIGS. 3A-3E, an example data flow scenario involving the system 200 providing location-based access control of secured data is shown and described below. The example shown in FIGS. 3A-3E illustrates aspects of various types of data that is exchanged between computing devices of the system 200 in the scenario illustrated above with respect to FIG. 1.

Figure 3A:
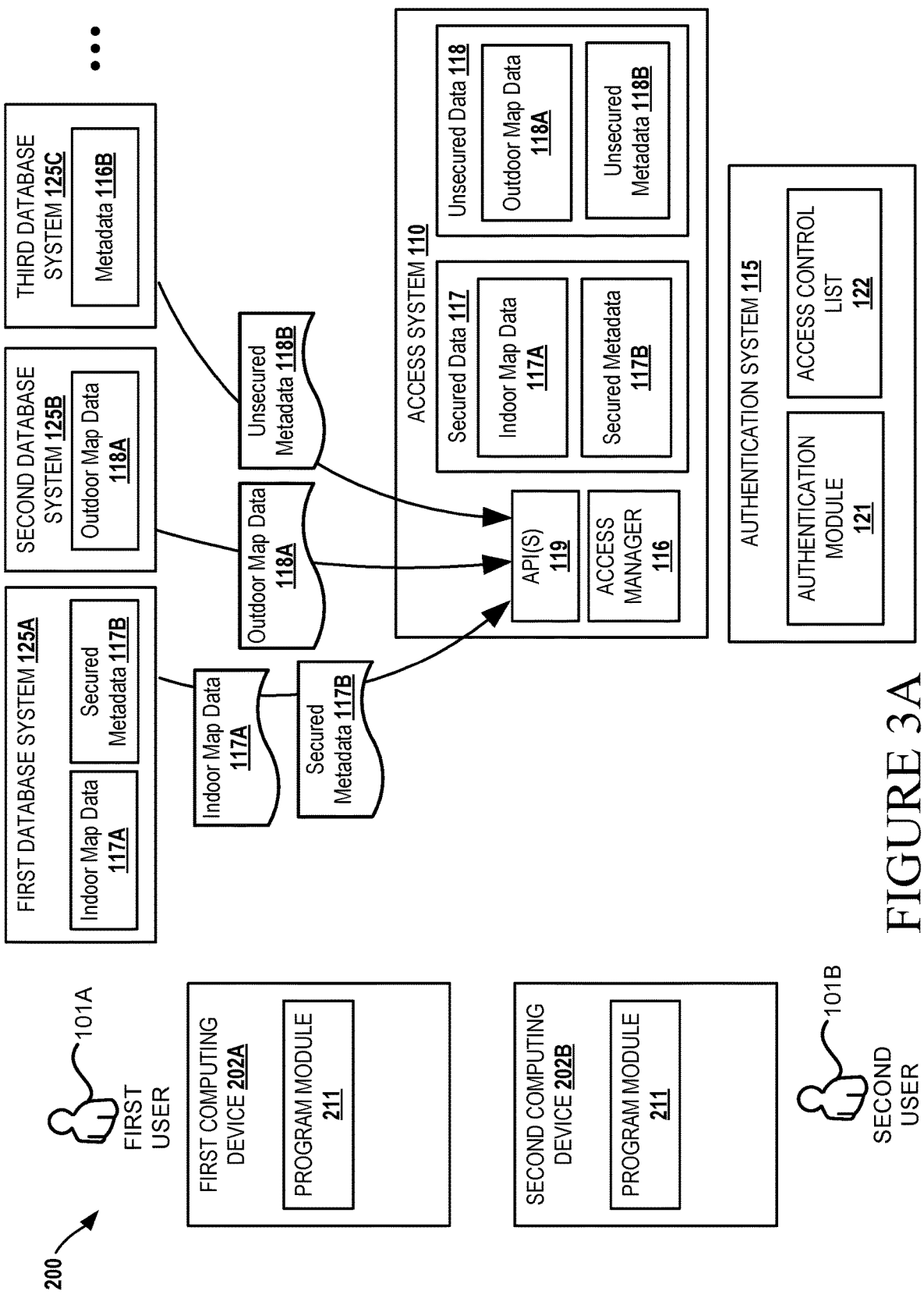
FIGS. 3A-3E illustrate an example data flow scenario of a system enabling location-based access control of secured data.

FIG. 3A illustrates that resource data, which may include secured resource data 117 and unsecured resource data 118, can be received from a number of database systems 125. Specifically, the indoor map data 117A and secured metadata 117B is provided by the first database system 125A, the outdoor map data 118A is provided by the second database system 125B, and the unsecured metadata 118B is provided by the third database system 125C. In this example, the first database system 125A can be a privately managed server, and the second database system 125B and the third database system 125C can be publicly accessible services, e.g., search engines, social networks, etc.

In this example, with reference to FIG. 1, the first user 101A does not have permissions to access a secured conference room in the sixth location 120F. In addition, the first user 101A does not have permissions to utilize equipment associated with the conference room or access secured data associated with the conference room.

Figure 3B:
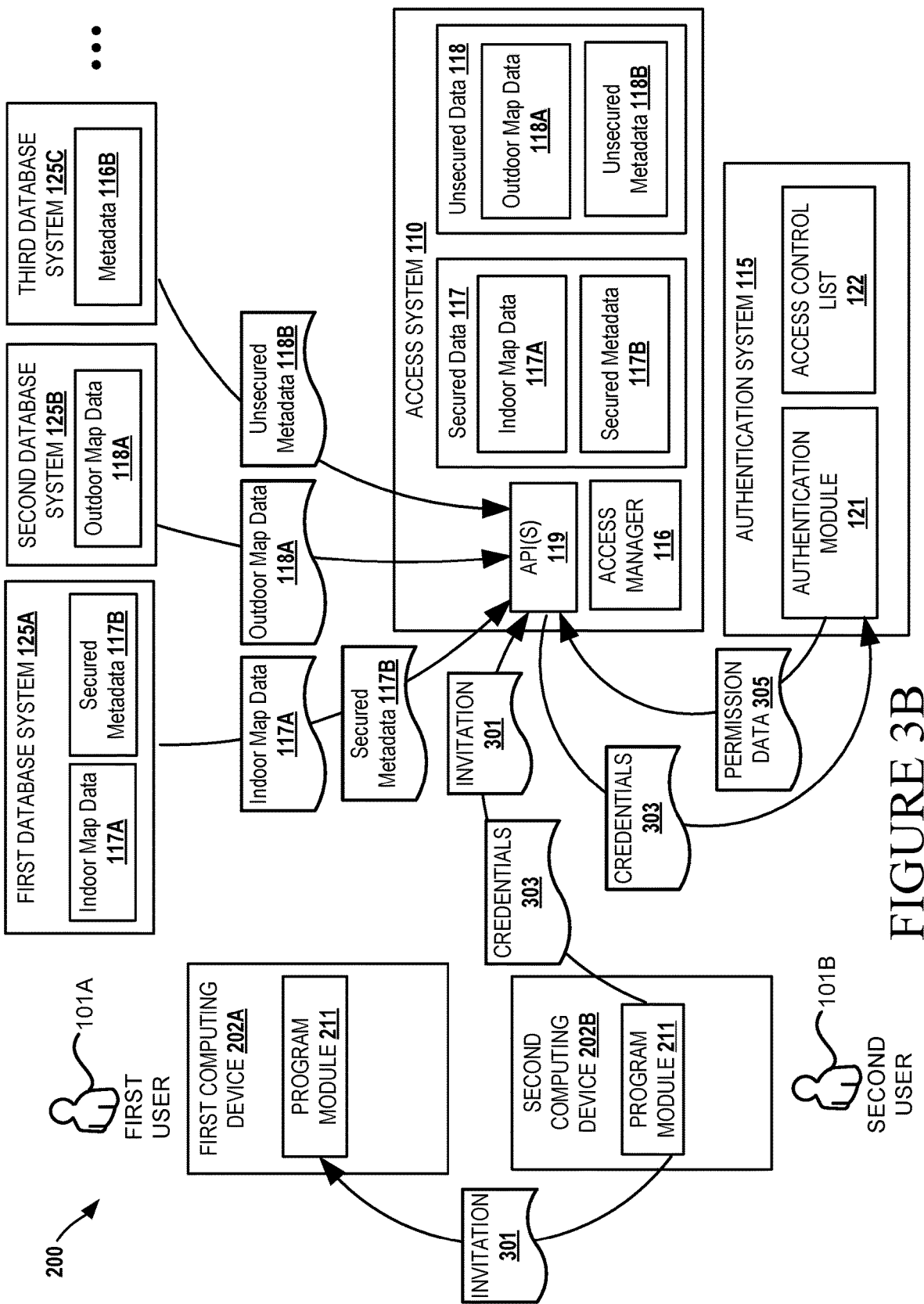

Also, as shown in FIG. 3B, the first user 101A receives an invitation 301 from the second user 101B to attend a meeting at the conference room. In some configurations, the invitation 301 can be in the form of a calendar event identifying a location, e.g., the conference room. In such an example, the invitation 301 can be communicated from the second computing device 120B to the first computing device 120A, either directly or through a service, such as a calendaring service. In some configurations, the invitation 301 can be communicated to the access system 110. This example is provided for illustrative purposes and is not be construed as limiting. It can be appreciated that the invitation 301 can be and other forms, such as an email, text message, and instant message or any other form of communication suitable for identifying a location and identifying an identity associated with permissions for granting access to resources.

It can be appreciated that credentials 303 associated with the second user 101B can be communicated from the second computing device 120B to the authentication system 115 for verification. In some configurations, the credentials 303 can be communicated to the access system 110 and, in turn, the access system 110 can communicate the credentials 303 to the authentication system 115. In some configurations, the credentials 303 can be communicated directly from the second computing device 120B to the authentication system 115.

The authentication system 115 can process the credentials 303 of the second user 101B with data from the access control list 122 to generate permission data 305. The permission data 305 can be communicated from the authentication system 115 to the access system 110. In this example, the second user 101B has permissions to grant access to resources associated with the sixth location 120F, and the permission data 305 communicated from the authentication system 115 to the access system 110 can indicate such permissions. In addition, the second user 101B has permissions to grant access to specific categories of data such as the indoor map data 117A and secured metadata 117B, and the permission data 305 communicated from the authentication system 115 to the access system 110 can indicate such permissions.

Figure 3C:
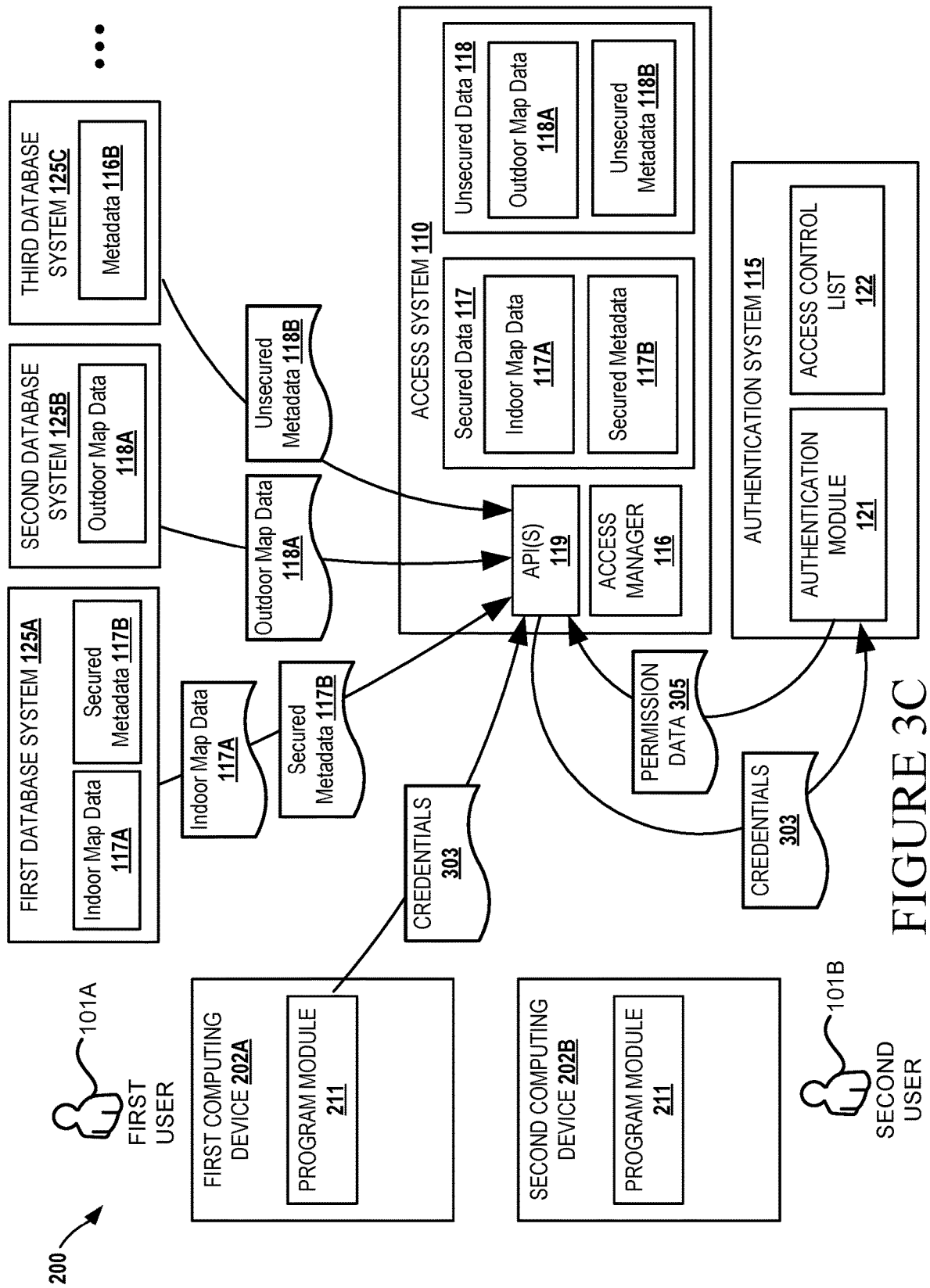

As shown in FIG. 3C, credentials 303 associated with the first user 101A can be communicated from the first computing device 120A to the authentication system 115 for verification. The authentication system 115 can process the credentials 303 of the first user 101A with data from the access control list 122 to generate permission data 305.

Figure 3D:
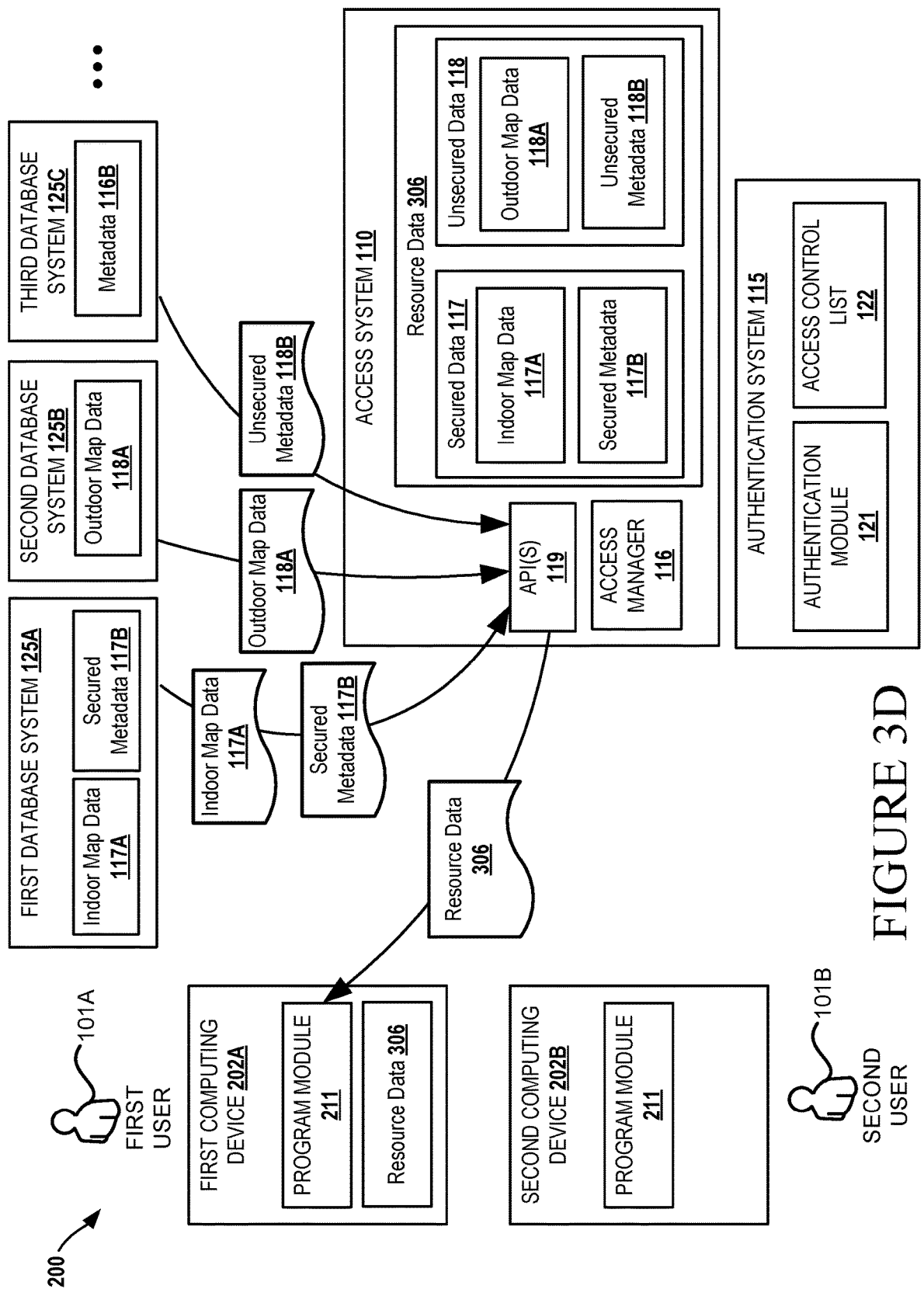

Next, as shown in FIG. 3D, based on the invitation 301 and the permission data 305, the access system 110 can communicate the appropriate resource data 306 to the first computing device 120A. In this example, based on the above stated permissions, the resource data 306 can include indoor map data 117A and secured metadata 117B. In addition, the resource data 306 can include the outdoor map data 118A and unsecured metadata 118B. Thus, the system 200 can provide a uniform interface for the clients to communicate credentials 303 resource data 306 to obtain combination of resource data, e.g., secured and unsecured data, without requiring the first computing device 120A to interface with multiple database systems 125.

With reference to FIG. 1, after the first user 101A receives the resource data 306, the first user 101A commutes from his office and the second building 110B to the conference room in the first building 110A. Based on positioning data obtained from the first computing device 202A or positioning data generated by another device, such as the camera 170, the access system 110 can modify the permissions that were granted in response to the invitation 301.

Figure 3E:
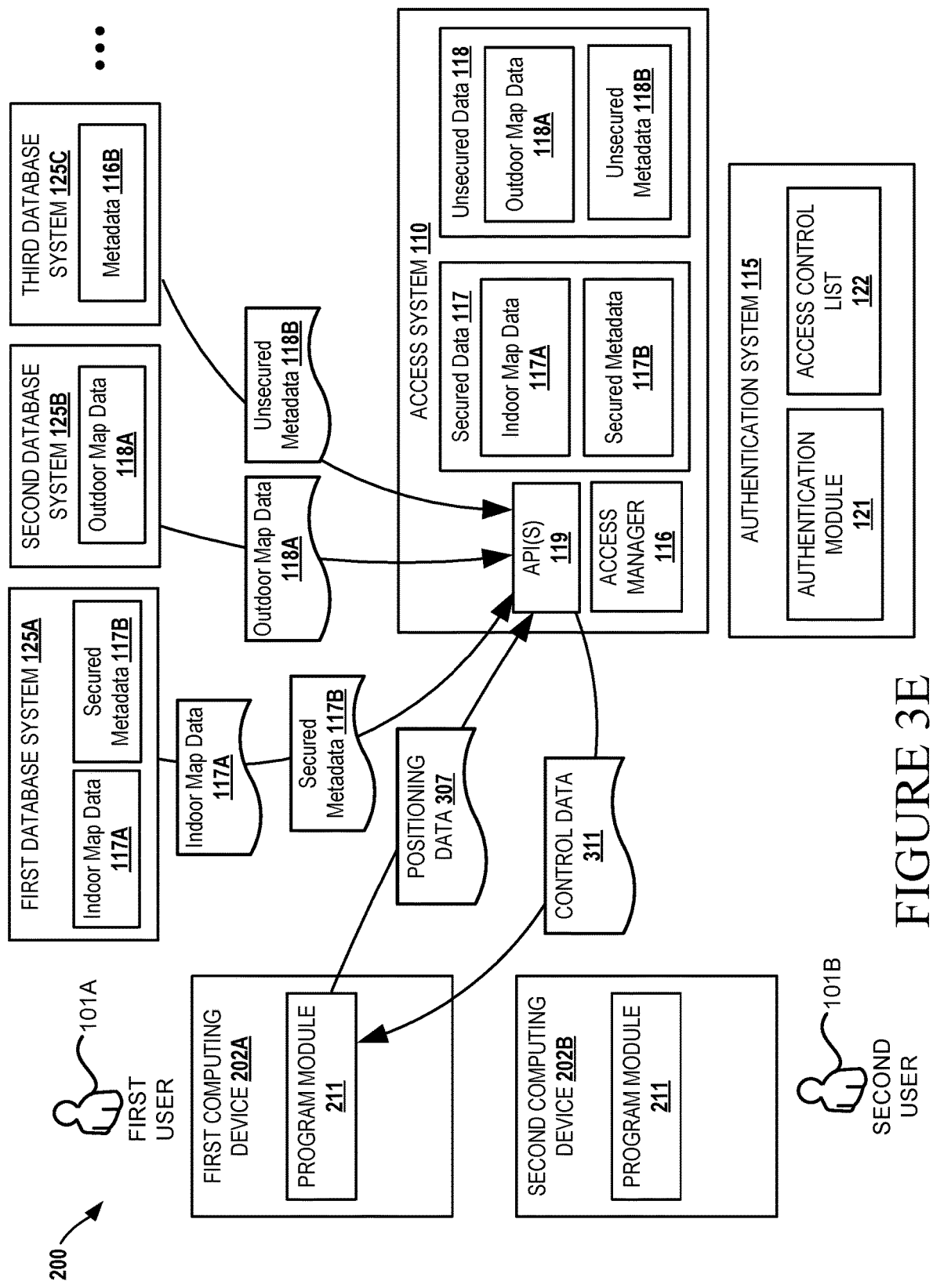

In this example, as shown in FIG. 3E, the access system 110 utilizes the positioning data 307 to modify the granted permissions based on movement patterns of the user. When the pattern of movement meets the one or more criteria, the access system 110, in this example, revokes the access to the resources 130 associated with the resource data 306. Among many other examples, as shown in FIG. 1, a pattern of movement of the first user 101A can include activity where the first user 101A exits the conference room, e.g., exits the sixth location 120F, exits the first building 110A either through an elevator or by walking through the view of the camera 170.

In some configurations, a one-time permission feature can be implemented. In such implementations, the access system 110 can grant access permissions based on the techniques disclosed herein, one of which includes the use of an invitation. The access system 110 can then monitor user activity to determine when the granted access rights have been exercised. The access rights can be revoked based on a number of factors. For instance, access rights can be revoked or modified once the access system 110 determines that the access rights have been utilized. In scenarios where the resources include data or a computer, access rights to such resources can be modified or revoked once the user accesses the data or utilizes the computer.

Upon determining that a pattern of movement has met one or more criteria, the access system 110 can revoke the access rights, which may include communicating control data 311 to the first computing device 202A to delete any stored resource data. These examples are provided for illustrative purposes and are not be construed as limiting. It can be appreciated that any suitable user activity or pattern of movement can be utilized to modify permissions associated with one or more resources.

Figure 4:
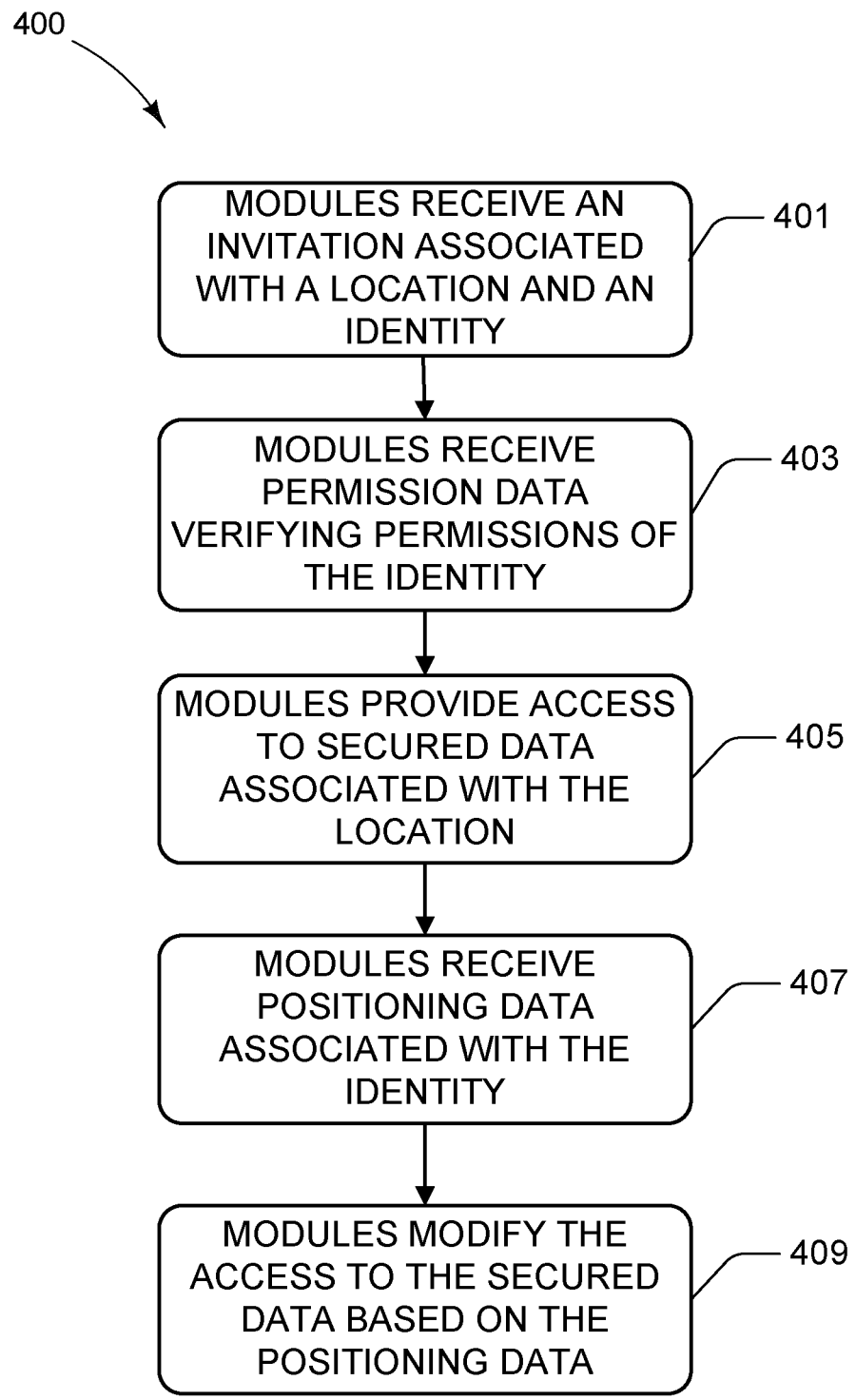
FIG. 4 is a flow diagram showing a routine illustrating aspects of a mechanism disclosed herein for enabling location-based access control of secured resources.

Turning now to FIG. 4, aspects of a routine 400 for enabling location-based access control of secured resources are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by an access manager 116, program module 211, and/or components of an operating system. In some configurations, the access manager 116 or another module running the features disclosed herein can be a dynamically linked library (DLL), a statically linked library, functionality produced by an application programming interface (API), a compiled program, an interpreted program, a script or any other executable set of instructions. Data, such as resource data 306, positioning data 307, control data 311 can be stored in a data structure in one or more memory components. Data can be retrieved from the data structure by addressing links or references to the data structure.

Although the following illustration refers to the components of the figures, it can be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system, such as the access system 110 can receive and/or process the data disclosed herein. Any service, circuit or application suitable for providing the techniques disclosed herein can be used in operations described herein.

With reference to FIG. 4, the routine 400 begins at operation 401 where one or more modules of a computing system receive an invitation 301 associated with a location and an identity. In one representative example, the invitation 301 can include scheduling data defining a calendar event. The calendar event can designate a location such as a conference room inviting one or more users associated with one or more identities to the conference room. The calendar event can also include a time and date for a particular meeting. In such configurations, the calendar event can also include a duration time for an event such as a meeting. For example, the calendar event can define a particular time period, e.g., from noon until 2 PM, on a particular day. The invitation 301 can be in the form of any communication suitable for identifying an identity and a location.

Next, at operation 403, one or more modules of a computing system can receive permission data 305 from one or more systems, such as the authentication system 115. As summarized above, the authentication system 115 can operate one or more authentication services for receiving credentials 303 associated with one or more identities indicated in the invitation 301. Based on the processing of the credentials 303, which may involve processing of an access control list 122, the access system 110 receives permission data 305 configured to permit the one or more identities to receive resource data 306.

Next, at operation 405, one or more modules of a computing system can provide access to secured data to computing devices or accounts associated with the one or more identities. The access to the secured data can be in response to receiving the permission data 305 from the authentication system 115. As summarized herein, the permission data 305 can be configured to permit the one or more identities to receive resource data 306 from the access system 110. In some configurations, providing access to secure data can involve the process of combining secured data with unsecured data from multiple resources.

In configurations where the invitation 301 includes a time and date, e.g., a meeting time, the one or more modules may only provide access to the resource data 306 for a predetermined period of time. Thus, in addition to controlling access to the resource data 306 by an analysis of the positioning data 307, the system 100 can control access to the resources, e.g., the resource data 306, by the use of the meeting time defined in the scheduling data. For instance, with reference to the above example, if the invitation defines a meeting time, access to one or more resources can be limited to the meeting time.

Next, at operation 407, one or more modules of a computing device can receive positioning data 307 associated with the one or more identities. Positioning data 307 may be received from computing devices 202 associated with the one or more identities or the positioning data 307 can be received from a security system, which may have cameras and other security devices.

Next, at operation 409, one or more modules other computing device can modify the access to the secured data based on the positioning data 307. In some configurations, when the positioning data 307 indicates a pattern of movement that meets one or more criteria, access to the secured data can be modified. In some configurations, the modification of the access to the secured data can involve revoking access rights, reducing access rights, increasing access rights, to name a few.

Figure 5:
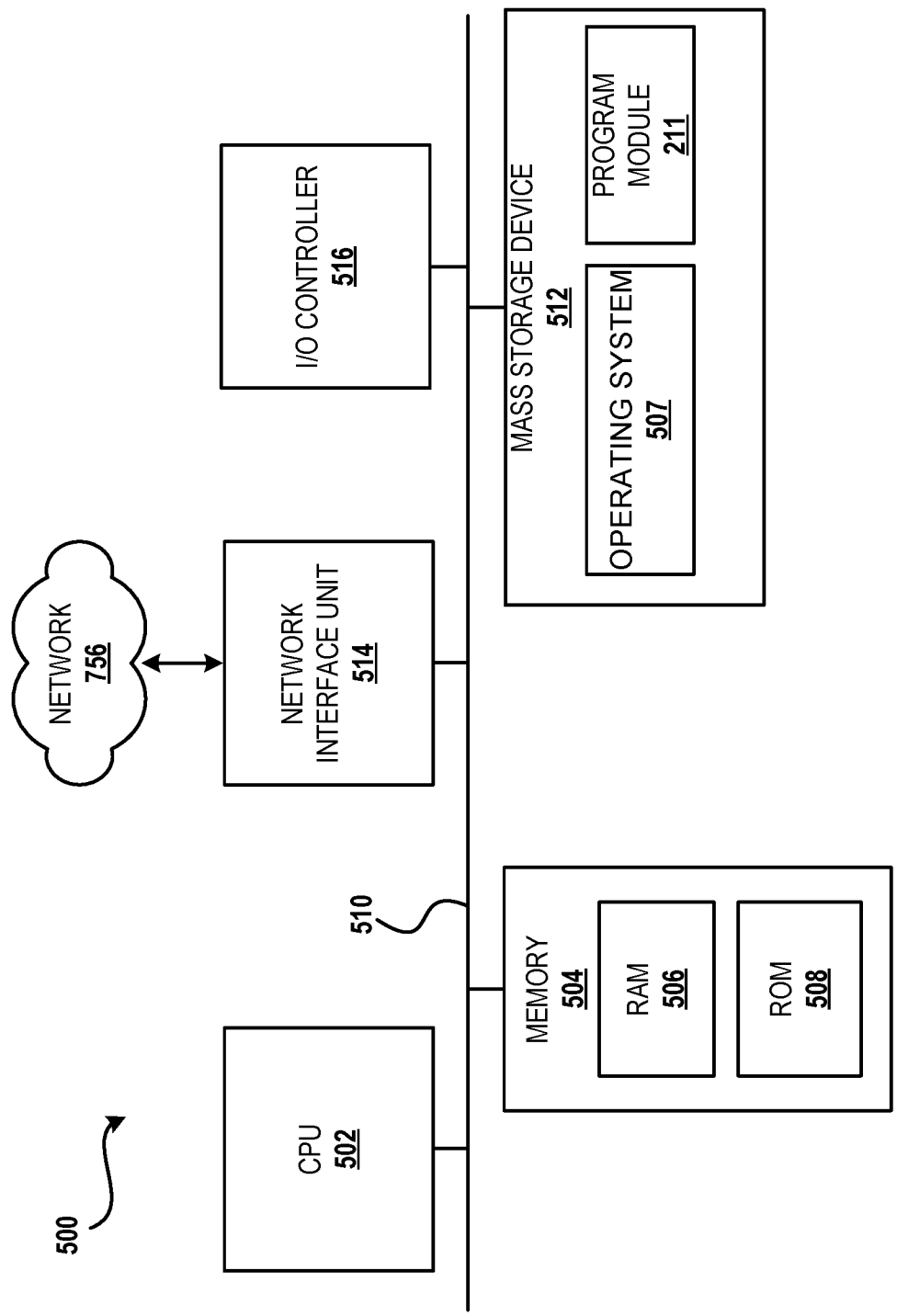
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a computer, such as the computing device 202 (FIG. 2), capable of executing the program components described herein. Thus, the computer architecture 500 illustrated in FIG. 5 illustrates an architecture for a server computer, mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 507, other data, and one or more application programs.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 756 and/or another network (not shown). The computer architecture 500 may connect to the network 756 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Figure 6:
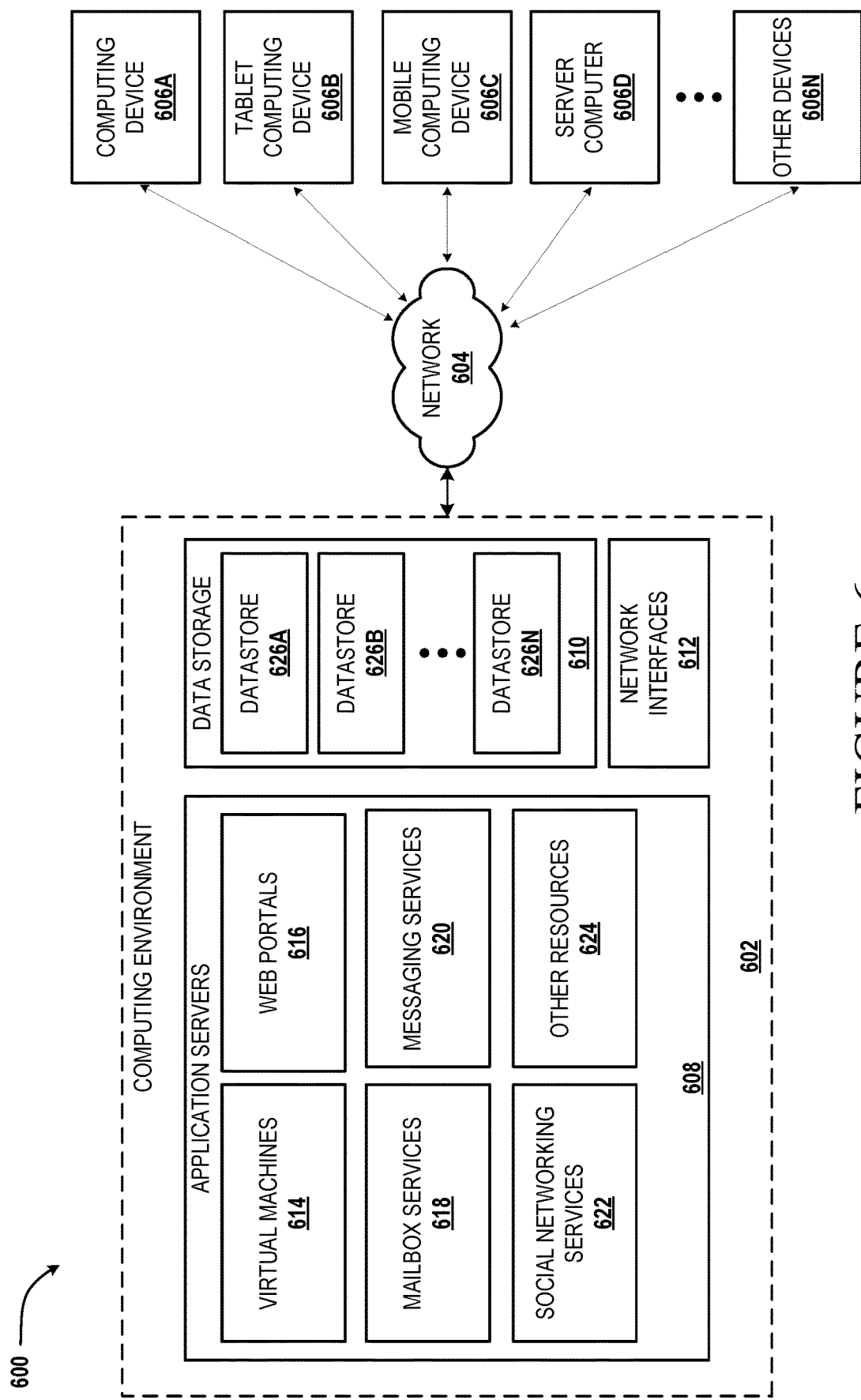
FIG. 6 is a diagram illustrating a distributed computing environment capable of implementing aspects of the techniques and technologies presented herein.

FIG. 6 depicts an illustrative distributed computing environment 600 capable of executing the software components described herein for providing location-based access control of secured resources. Thus, the distributed computing environment 600 illustrated in FIG. 6 can be utilized to execute any aspects of the software components presented herein. For example, the distributed computing environment 600 can be utilized to execute aspects of the software components described herein.

According to various implementations, the distributed computing environment 600 includes a computing environment 602 operating on, in communication with, or as part of the network 604. The network 604 may be or may include the network 756, described above with reference to FIG. 5. The network 604 also can include various access networks. One or more client devices 606A-606N (hereinafter referred to collectively and/or generically as "clients 606") can communicate with the computing environment 602 via the network 604 and/or other connections (not illustrated in FIG. 6). In one illustrated configuration, the clients 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 can communicate with the computing environment 602. Two example computing architectures for the clients 606 are illustrated and described herein with reference to FIGS. 5 and 7. It should be understood that the illustrated clients 606 and computing architectures illustrated and described herein are illustrative, and should not be construed as being limited in any way.

In the illustrated configuration, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated configuration, the application servers 608 host one or more virtual machines 614 for hosting applications or other functionality. According to various implementations, the virtual machines 614 host one or more applications and/or software modules for providing location-based access control of secured resources. It should be understood that this configuration is illustrative, and should not be construed as being limiting in any way. The application servers 608 also host or provide access to one or more portals, link pages, Web sites, and/or other information ("Web portals") 616.

According to various implementations, the application servers 608 also include one or more mailbox services 618 and one or more messaging services 620. The mailbox services 618 can include electronic mail ("email") services. The mailbox services 618 also can include various personal information management ("PIM") and presence services including, but not limited to, calendar services, contact management services, collaboration services, and/or other services. The messaging services 620 can include, but are not limited to, instant messaging services, chat services, forum services, and/or other communication services.

The application servers 608 also may include one or more social networking services 622. The social networking services 622 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 622 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 622 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 622 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 622 are not mentioned herein for the sake of brevity. As such, the above configurations are illustrative, and should not be construed as being limited in any way. According to various implementations, the social networking services 622 may host one or more applications and/or software modules for providing the functionality described herein, such as providing location-based access control of secured resources. For instance, any one of the application servers 608 may communicate or facilitate the functionality and features described herein. For instance, a social networking application, mail client, messaging client or a browser running on a phone or any other client 606 may communicate with a networking service 622 and facilitate the functionality, even in part, described above with respect to FIG. 4.

As shown in FIG. 6, the application servers 608 also can host other services, applications, portals, and/or other resources ("other resources") 624. The other resources 624 can include, but are not limited to, document sharing, rendering or any other functionality. It thus can be appreciated that the computing environment 602 can provide integration of the concepts and technologies disclosed herein provided herein with various mailbox, messaging, social networking, and/or other services or resources.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more server computers configured to host data for the computing environment 602. The data storage 610 can include, host, or provide one or more real or virtual datastores 626A-626N (hereinafter referred to collectively and/or generically as "datastores 626"). The datastores 626 are configured to host data used or created by the application servers 608 and/or other data. Although not illustrated in FIG. 6, the datastores 626 also can host or store web page documents, word documents, presentation documents, data structures, algorithms for execution by a recommendation engine, and/or other data utilized by any application program or another module. Aspects of the datastores 626 may be associated with a service for storing files.

The computing environment 602 can communicate with, or be accessed by, the network interfaces 612. The network interfaces 612 can include various types of network hardware and software for supporting communications between two or more computing devices including, but not limited to, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the clients 606. It should be understood that the clients 606 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 600 to utilize the functionality described herein for providing location-based access control of secured resources, among other aspects. In one specific example, as summarized above, techniques described herein may be implemented, at least in part, by the web browser application 510 of FIG. 5, which works in conjunction with the application servers 608 of FIG. 6.

Turning now to FIG. 7, an illustrative computing device architecture 700 for a computing device that is capable of executing various software components described herein for providing location-based access control of secured resources. The computing device architecture 700 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 700 is applicable to any of the clients 606 shown in FIG. 6. Moreover, aspects of the computing device architecture 700 may be applicable to traditional desktop computers, portable computers (e.g., phones, laptops, notebooks, ultra-portables, and netbooks), server computers, and other computer systems, such as described herein with reference to FIG. 5. For example, the single touch and multi-touch aspects disclosed herein below may be applied to desktop computers that utilize a touchscreen or some other touch-enabled device, such as a touch-enabled track pad or touch-enabled mouse.

The computing device architecture 700 illustrated in FIG. 7 includes a processor 702, memory components 704, network connectivity components 706, sensor components 708, input/output components 710, and power components 712. In the illustrated configuration, the processor 702 is in communication with the memory components 704, the network connectivity components 706, the sensor components 708, the input/output ("I/O") components 710, and the power components 712. Although no connections are shown between the individuals components illustrated in FIG. 7, the components can interact to carry out device functions. In some configurations, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, a touch-enabled input.

In some configurations, the processor 702 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 702 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some configurations, the processor 702 is fabricated, in part, utilizing a package-on-package ("PoP") integrated circuit packaging technique. The processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, Calif. and others. In some configurations, the processor 702 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 704 include a random access memory ("RAM") 714, a read-only memory ("ROM") 716, an integrated storage memory ("integrated storage") 718, and a removable storage memory ("removable storage") 720. In some configurations, the RAM 714 or a portion thereof, the ROM 716 or a portion thereof, and/or some combination the RAM 714 and the ROM 716 is integrated in the processor 702. In some configurations, the ROM 716 is configured to store a firmware, an operating system or a portion thereof (e.g., operating system kernel), and/or a bootloader to load an operating system kernel from the integrated storage 718 and/or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some configurations, the removable storage 720 is provided in lieu of the integrated storage 718. In other configurations, the removable storage 720 is provided as additional optional storage. In some configurations, the removable storage 720 is logically combined with the integrated storage 718 such that the total available storage is made available as a total combined storage capacity. In some configurations, the total combined capacity of the integrated storage 718 and the removable storage 720 is shown to a user instead of separate storage capacities for the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from the network 756 or another network, which may be a WWAN, a WLAN, or a WPAN. Although only the network 756 is illustrated, the network connectivity components 706 may facilitate simultaneous communication with multiple networks, including the network 604 of FIG. 6. For example, the network connectivity components 706 may facilitate simultaneous communications with multiple networks via one or more of a WWAN, a WLAN, or a WPAN.

The network 756 may be or may include a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 756 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 756 may be configured to provide voice and/or data communications with any combination of the above technologies. The network 756 may be configured to or adapted to provide voice and/or data communications in accordance with future generation technologies.

In some configurations, the WWAN component 722 is configured to provide dual-multi-mode connectivity to the network 756. For example, the WWAN component 722 may be configured to provide connectivity to the network 756, wherein the network 756 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 756 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 724 is configured to connect to the network 756 via the WI-FI access points. Such connections may be secured via various encryption technologies including, but not limited to, WI-FI Protected Access ("WPA"), WPA2, Wired Equivalent Privacy ("WEP"), and the like.

The network 756 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 726 is configured to facilitate communications with other devices, such as peripherals, computers, or other computing devices via the WPAN.

The sensor components 708 include a magnetometer 728, an ambient light sensor 730, a proximity sensor 732, an accelerometer 734, a gyroscope 736, and a Global Positioning System sensor ("GPS sensor") 738. It is contemplated that other sensors, such as, but not limited to, temperature sensors or shock detection sensors, also may be incorporated in the computing device architecture 700.

The magnetometer 728 is configured to measure the strength and direction of a magnetic field. In some configurations the magnetometer 728 provides measurements to a compass application program stored within one of the memory components 704 in order to provide a user with accurate directions in a frame of reference including the cardinal directions, north, south, east, and west. Similar measurements may be provided to a navigation application program that includes a compass component. Other uses of measurements obtained by the magnetometer 728 are contemplated.

The ambient light sensor 730 is configured to measure ambient light. In some configurations, the ambient light sensor 730 provides measurements to an application program stored within one the memory components 704 in order to automatically adjust the brightness of a display (described below) to compensate for low-light and high-light environments. Other uses of measurements obtained by the ambient light sensor 730 are contemplated.

The proximity sensor 732 is configured to detect the presence of an object or thing in proximity to the computing device without direct contact. In some configurations, the proximity sensor 732 detects the presence of a user's body (e.g., the user's face) and provides this information to an application program stored within one of the memory components 704 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 732 are contemplated.

The accelerometer 734 is configured to measure proper acceleration. In some configurations, output from the accelerometer 734 is used by an application program as an input mechanism to control some functionality of the application program. For example, the application program may be a video game in which a character, a portion thereof, or an object is moved or otherwise manipulated in response to input received via the accelerometer 734. In some configurations, output from the accelerometer 734 is provided to an application program for use in switching between landscape and portrait modes, calculating coordinate acceleration, or detecting a fall. Other uses of the accelerometer 734 are contemplated.

The gyroscope 736 is configured to measure and maintain orientation. In some configurations, output from the gyroscope 736 is used by an application program as an input mechanism to control some functionality of the application program. For example, the gyroscope 736 can be used for accurate recognition of movement within a 3D environment of a video game application or some other application. In some configurations, an application program utilizes output from the gyroscope 736 and the accelerometer 734 to enhance control of some functionality of the application program. Other uses of the gyroscope 736 are contemplated.

The GPS sensor 738 is configured to receive signals from GPS satellites for use in calculating a location. The location calculated by the GPS sensor 738 may be used by any application program that requires or benefits from location information. For example, the location calculated by the GPS sensor 738 may be used with a navigation application program to provide directions from the location to a destination or directions from the destination to the location. Moreover, the GPS sensor 738 may be used to provide location information to an external location-based service, such as E911 service. The GPS sensor 738 may obtain location information generated via WI-FI, WIMAX, and/or cellular triangulation techniques utilizing one or more of the network connectivity components 706 to aid the GPS sensor 738 in obtaining a location fix. The GPS sensor 738 may also be used in Assisted GPS ("A-GPS") systems. The GPS sensor 738 can also operate in conjunction with other components, such as the processor 702, to generate positioning data for the computing device 700.

The I/O components 710 include a display 740, a touchscreen 742, a data I/O interface component ("data I/O") 744, an audio I/O interface component ("audio I/O") 746, a video I/O interface component ("video I/O") 748, and a camera 750. In some configurations, the display 740 and the touchscreen 742 are combined. In some configurations two or more of the data I/O component 744, the audio I/O component 746, and the video I/O component 748 are combined. The I/O components 710 may include discrete processors configured to support the various interface described below, or may include processing functionality built-in to the processor 702.

The display 740 is an output device configured to present information in a visual form. In particular, the display 740 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 740 is a liquid crystal display ("LCD") utilizing any active or passive matrix technology and any backlighting technology (if used). In some configurations, the display 740 is an organic light emitting diode ("OLED") display. Other display types are contemplated.

The touchscreen 742, also referred to herein as a "touch-enabled screen," is an input device configured to detect the presence and location of a touch. The touchscreen 742 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 742 is incorporated on top of the display 740 as a transparent layer to enable a user to use one or more touches to interact with objects or other information presented on the display 740. In other configurations, the touchscreen 742 is a touch pad incorporated on a surface of the computing device that does not include the display 740. For example, the computing device may have a touchscreen incorporated on top of the display 740 and a touch pad on a surface opposite the display 740.

In some configurations, the touchscreen 742 is a single-touch touchscreen. In other configurations, the touchscreen 742 is a multi-touch touchscreen. In some configurations, the touchscreen 742 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 742. As such, a developer may create gestures that are specific to a particular application program.

In some configurations, the touchscreen 742 supports a tap gesture in which a user taps the touchscreen 742 once on an item presented on the display 740. The tap gesture may be used for various reasons including, but not limited to, opening or launching whatever the user taps. In some configurations, the touchscreen 742 supports a double tap gesture in which a user taps the touchscreen 742 twice on an item presented on the display 740. The double tap gesture may be used for various reasons including, but not limited to, zooming in or zooming out in stages. In some configurations, the touchscreen 742 supports a tap and hold gesture in which a user taps the touchscreen 742 and maintains contact for at least a pre-defined time. The tap and hold gesture may be used for various reasons including, but not limited to, opening a context-specific menu.

In some configurations, the touchscreen 742 supports a pan gesture in which a user places a finger on the touchscreen 742 and maintains contact with the touchscreen 742 while moving the finger on the touchscreen 742. The pan gesture may be used for various reasons including, but not limited to, moving through screens, images, or menus at a controlled rate. Multiple finger pan gestures are also contemplated. In some configurations, the touchscreen 742 supports a flick gesture in which a user swipes a finger in the direction the user wants the screen to move. The flick gesture may be used for various reasons including, but not limited to, scrolling horizontally or vertically through menus or pages. In some configurations, the touchscreen 742 supports a pinch and stretch gesture in which a user makes a pinching motion with two fingers (e.g., thumb and forefinger) on the touchscreen 742 or moves the two fingers apart. The pinch and stretch gesture may be used for various reasons including, but not limited to, zooming gradually in or out of a web site, map, or picture.

Although the above gestures have been described with reference to the use one or more fingers for performing the gestures, other appendages such as toes or objects such as styluses may be used to interact with the touchscreen 742. As such, the above gestures should be understood as being illustrative and should not be construed as being limiting in any way.

The data I/O interface component 744 is configured to facilitate input of data to the computing device and output of data from the computing device. In some configurations, the data I/O interface component 744 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 746 is configured to provide audio input and/or output capabilities to the computing device. In some configurations, the audio I/O interface component 746 includes a microphone configured to collect audio signals. In some configurations, the audio I/O interface component 746 includes a headphone jack configured to provide connectivity for headphones or other external speakers. In some configurations, the audio I/O interface component 746 includes a speaker for the output of audio signals. In some configurations, the audio I/O interface component 746 includes an optical audio cable out.

The video I/O interface component 748 is configured to provide video input and/or output capabilities to the computing device. In some configurations, the video I/O interface component 748 includes a video connector configured to receive video as input from another device (e.g., a video media player such as a DVD or BLURAY player) or send video as output to another device (e.g., a monitor, a television, or some other external display). In some configurations, the video I/O interface component 748 includes a High-Definition Multimedia Interface ("HDMI"), mini- HDMI, micro-HDMI, DisplayPort, or proprietary connector to input/output video content. In some configurations, the video I/O interface component 748 or portions thereof is combined with the audio I/O interface component 746 or portions thereof.

The camera 750 can be configured to capture still images and/or video. The camera 750 may utilize a charge coupled device ("CCD") or a complementary metal oxide semiconductor ("CMOS") image sensor to capture images. In some configurations, the camera 750 includes a flash to aid in taking pictures in low-light environments. Settings for the camera 750 may be implemented as hardware or software buttons.

Although not illustrated, one or more hardware buttons may also be included in the computing device architecture 700. The hardware buttons may be used for controlling some operational aspect of the computing device. The hardware buttons may be dedicated buttons or multi-use buttons. The hardware buttons may be mechanical or sensor-based.

The illustrated power components 712 include one or more batteries 752, which can be connected to a battery gauge 754. The batteries 752 may be rechargeable or disposable. Rechargeable battery types include, but are not limited to, lithium polymer, lithium ion, nickel cadmium, and nickel metal hydride. Each of the batteries 752 may be made of one or more cells.

The battery gauge 754 can be configured to measure battery parameters such as current, voltage, and temperature. In some configurations, the battery gauge 754 is configured to measure the effect of a battery's discharge rate, temperature, age and other factors to predict remaining life within a certain percentage of error. In some configurations, the battery gauge 754 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 712 may also include a power connector, which may be combined with one or more of the aforementioned I/O components 710. The power components 712 may interface with an external power system or charging equipment via an I/O component.

The disclosure presented herein may be considered in view of the following clauses.

Clause A: A computer-readable storage medium having computer-executable instructions stored thereupon which, when executed by a one or more processors of a computing device, cause the one or more processors of the computing device to: receive invitation data indicating a location and an identity, receive permission data generated by an authentication system, wherein the permission data indicates one or more permissions associated with the identity, and provide access to at least one category of secured data associated with the location, wherein the access is provided to at least one client computing device associated with the identity, wherein the access to the at least one category of secured data is provided in response to receiving the scheduling data identifying the identity, and wherein the access to the at least one category of secured data is provided in response to receiving the permission data verifying the identity, and wherein the access to the at least one category of secured data is provided in response to receiving positioning data indicating a predetermined pattern of movement of the at least one client computing device.

Clause B: The computer-readable storage medium of Clause A, wherein the computer-executable instructions further cause the one or more processors to: receive positioning data from the at least one client computing device, wherein the positioning data indicates a second predetermined pattern of movement of the at least one client computing device, determine that the second predetermined pattern of movement or a location of the at least one client computing device meets one or more criteria; and revoke access to the at least one category of secured data, in response to determining that the second predetermined pattern of movement or the location meets the one or more criteria.

Clause C: The computer-readable storage medium of Clauses A-B, wherein the second predetermined pattern of movement meets the one or more or more criteria when the positioning data indicates that the at least one client computing device has entered and exited the location.

Clause D: The computer-readable storage medium of Clauses A-C, wherein the second predetermined pattern of movement meets the one or more or more criteria when the positioning data indicates that the at least one client computing device has passed through an egress associated of the location.

Clause E: The computer-readable storage medium of Clauses A-D, wherein the identify is associated with a first category of users, wherein access to the at least one category of secured data is provided to the first category of users in response to in response to receiving the scheduling data.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method, comprising:
receiving, at a computing device, a meeting invitation identifying a location and at least one invitee, the meeting invitation configured to provide the at least one invitee with physical access to the location, wherein the meeting invitation causes a system to control a pathway allowing physical access to the location;
providing, based on the meeting invitation, the at least one invitee with physical access to the location by controlling the pathway allowing the at least one invitee to physically access the location through the pathway in response to positioning data indicating that the at least one invitee is at a predetermined location near the location wherein the positioning data is based in part on a face recognition camera system identifying the at least one invitee;
receiving the positioning data from the face recognition camera system identifying the at least one invitee, wherein the positioning data indicates a pattern of movement of the at least one invitee;
determining that the pattern of movement indicates that the at least one invitee has exited the location; and
revoking physical access to the location identified in the meeting invitation by controlling the pathway to restrict the at least one invitee identified in the meeting invitation from physical access to the location through the pathway, in response to determining that the pattern of movement indicates that the at least one invitee has exited the location.

2. The computer-implemented method of claim 1, wherein determining that the at least one invitee has exited the location comprises determining that the at least one invitee has passed through an egress associated with the location in a predetermined direction.

3. The computer-implemented method of claim 1, wherein determining that the at least one invitee has exited the location comprises determining that the at least one invitee has moved through an area in a predetermined direction.

4. The computer-implemented method of claim 1, wherein the positioning data indicates a second pattern of movement of the at least one invitee and, wherein access to secured data associated with the location is provided in response to detecting the second pattern of movement.

5. The computer-implemented method of claim 1, further comprising:
   collating secured data and public data to generate resource data; and
   communicating the resource data to a client computing device associated with the at least one invitee when access of the location is provided.

6. The computer-implemented method of claim 1, wherein the positioning data indicates that the at least one invitee is at the predetermined location when the at least one invitee passes through the predetermined location.

7. The computer-implemented method of claim 1, wherein the positioning data indicates that the at least one invitee is at the predetermined location when the at least one invitee passes through the predetermined location near the location in a predetermined direction.

8. A system, comprising:
   a processor; and
   a memory in communication with the processor, the memory having computer-readable instructions stored thereupon that, when executed by the processor, cause the processor to:
   receive a meeting invitation indicating a location and an identity, the meeting invitation configured to provide at least one invitee with physical access to the location, wherein the meeting invitation causes the system to control a pathway allowing physical access to the location;
   provide the at least one invitee associated with the identity access to the location by controlling the pathway allowing the at least one invitee to physically access the location through the pathway in response to positioning data indicating that the at least one invitee is at a predetermined location near the location, wherein the positioning data is based in part on a face recognition camera system identifying the at least one invitee;
   receive the positioning data from the face recognition camera system identifying the at least one invitee, wherein the positioning data indicates a pattern of movement of the at least one invitee;
   determine that the pattern of movement indicates that the at least one invitee has exited the location; and
   revoke physical access to the location identified in the meeting invitation by controlling the pathway to restrict the at least one invitee identified in the meeting invitation from physical access to the location through the pathway, in response to determining that the pattern of movement indicates that the at least one invitee has exited the location.

9. The system of claim 8, wherein determining that the at least one invitee has exited the location comprises determining that the at least one invitee has passed through an egress associated with the location.

10. The system of claim 8, wherein determining that the at least one invitee has exited the location comprises determining that the at least one invitee has moved through an area in a predetermined direction.

11. The system of claim 8, wherein the positioning data indicates a second pattern of movement of the at least one invitee and wherein access to secured data associated with the location is provided in response to detecting the second pattern of movement.

12. The system of claim 8, wherein the instructions further cause the processor to:
   collate secured data and public data to generate resource data; and
   communicate the resource data to a client computing device associated with the at least one invitee when access of the location is provided.

13. A non-transitory computer-readable storage medium having computer-executable instructions stored thereupon which, when executed by one or more processors of a computing device, cause the one or more processors of the computing device to:
   receive a meeting invitation indicating a location and an identity, the meeting invitation configured to provide at least one invitee with physical access to the location, wherein the meeting invitation causes a system to control a pathway allowing physical access to the location;
   provide the at least one invitee associated with the identity access to the location by controlling the pathway allowing the at least one invitee to physically access the location through the pathway in response to positioning data indicating that the at least one invitee is at a predetermined location near the location, wherein the positioning data is based in part on a face recognition camera system identifying the at least one invitee;
   receive the positioning data from the face recognition camera system identifying the at least one invitee, wherein the positioning data indicates a pattern of movement of the at least one invitee;
   determine that the pattern of movement indicates that the at least one invitee has exited the location; and
   revoke physical access to the location identified in the meeting invitation by controlling the pathway to restrict the at least one invitee identified in the meeting invitation from physical access to the location through the pathway, in response to determining that the pattern of movement indicates that the at least one invitee has exited the location.

14. The non-transitory computer-readable storage medium of claim 13, wherein determining that the at least one invitee has exited the location comprises determining that the at least one invitee has passed through an egress associated with the location.

15. The non-transitory computer-readable storage medium of claim 13, wherein the positioning data indicates a second pattern of movement of the at least one invitee and wherein access to secured data associated with the location is provided in response to detecting the second pattern of movement.

16. The non-transitory computer-readable storage medium of claim 13, wherein the instructions further cause the one or more processors to:
   collate secured data and public data to generate resource data; and communicate the resource data to a client computing device associated with the at least one invitee when access of the location is provided.

\* \* \* \* \*